United States Patent [19]
Wang

[11] Patent Number: 5,912,644
[45] Date of Patent: Jun. 15, 1999

[54] SPREAD SPECTRUM POSITION DETERMINATION, RANGING AND COMMUNICATION SYSTEM

[76] Inventor: James J. M. Wang, 1473 Waverly Rd., San Marino, Calif. 91108

[21] Appl. No.: 08/906,092

[22] Filed: Aug. 5, 1997

[51] Int. Cl.$^6$ ..................................................... G01S 03/02
[52] U.S. Cl. ........................................... 342/457; 375/200
[58] Field of Search ..................................... 342/457, 463; 370/347, 478; 375/200, 203

[56] References Cited

U.S. PATENT DOCUMENTS

| | | |
|---|---|---|
| 3,150,372 | 9/1964 | Groth, Jr. . |
| 3,868,692 | 2/1975 | Woodard et al. . |
| 4,136,394 | 1/1979 | Jones et al. . |
| 4,297,701 | 10/1981 | Henriques . |
| 4,480,310 | 10/1984 | Alvarez . |
| 4,665,404 | 5/1987 | Christy et al. . |
| 4,698,781 | 10/1987 | Cockerell, Jr. . |
| 4,703,444 | 10/1987 | Storms, Jr. et al. . |
| 4,731,613 | 3/1988 | Endo et al. . |
| 5,056,106 | 10/1991 | Wang et al. . |
| 5,364,093 | 11/1994 | Huston et al. . |
| 5,365,516 | 11/1994 | Jandrell . |
| 5,365,544 | 11/1994 | Schilling . |
| 5,434,789 | 6/1995 | Fraker et al. . |
| 5,469,175 | 11/1995 | Boman . |
| 5,475,627 | 12/1995 | Arnold et al. ............................. 370/29 |
| 5,506,864 | 4/1996 | Schilling . |
| 5,526,357 | 6/1996 | Jandrell . |
| 5,572,516 | 11/1996 | Miya et al. ................................ 370/18 |
| 5,745,480 | 4/1998 | Behtash et al. .......................... 370/252 |

*Primary Examiner*—Mark Hellner
*Attorney, Agent, or Firm*—Hoffman, Wasson & Gitler

[57] ABSTRACT

The spread spectrum wireless position determinator, ranging, and communication system is disclosed in this invention. The system consists of handheld or otherwise mobile apparatus which can be hand-carried or installed in the carts or vehicles, fixed-position reference stations deployed throughout the vicinity of the operating region of interests, and a central reference station. The mobile apparatus includes a spread spectrum transceiver, an input unit, and an output unit, which supports four functions: 1). accurately determines its position within the operating region and distance to pre-defined features within the region, 2). provides a voice communications with another mobile apparatus or central reference station within the region, 3). transmits or receives data message which can be routed via the reference stations to the central station, or other mobile apparatus within the region, 4). displays various information or stores information entered by the operator. The central reference station also has a spread spectrum radio transceiver which can transmit and receive voice or data massage to and from any mobile apparatuses or reference stations within the region and a computer which collects and processes the radio data, maintains the databases for the operation of the system, or provides a man-machine interface for the system. The reference stations are deployed in strategic locations through the region such that the mobile apparatuses in any accessible location can communicate with one or more reference stations. All reference stations contain a spread spectrum transceiver, which supports the radiolocationing function initiated by the mobile apparatuses and relays any received data packets to other reference stations, central station, or mobile apparatuses.

27 Claims, 10 Drawing Sheets

| 40 | 41 | 42 | 43 | 44 | 45 |
|---|---|---|---|---|---|
| 16 SYMBOLS | 1400-2032 SYMBOLS | 12 SYMBOLS | <4 SYMBOL | 1400-2032 SYMBOLS | <4 SYMBOL |
| GUARD TIME | S-PACKET | GUARD TIME | DELAY | S-PACKET | RESIDUAL DELAY |

S-FRAME FOR INITIATING STATION 46

| 47 | 48 | 49 | 50 | 51 |
|---|---|---|---|---|
| 16 SYMBOLS | 1400-2032 SYMBOLS | 12 SYMBOLS | 1400-2032 SYMBOLS | 4 SYMBOL |
| GUARD TIME | S-PACKET | GUARD TIME | S-PACKET | GUARD TIME |

S-FRAME FOR RESPONDING STATION 52

| 53 | 54 | 55 | 56 | 57 |
|---|---|---|---|---|
| 1280 SYMBOLS | 8 SYMBOLS | 16 SYMBOLS | 24 SYMBOLS | 72-824 SYMBOLS |
| PREAMBLE | UNIQUE WORD | ID CODE | SIGNALING | DATA |

S-PACKET FORMAT 58

FIG. 4

| 59 | 60 | 61 | 62 | 63 | 64 |
|---|---|---|---|---|---|
| 16 SYMBOLS | 2032 SYMBOLS | 12 SYMBOLS | <4 SYMBOL | 2032 SYMBOLS | <4 SYMBOL |
| GUARD TIME | R-PACKET | GUARD TIME | DELAY | R-PACKET | RESIDUAL DELAY |

R-FRAME FOR INITIATING STATION 65

| 66 | 67 | 68 | 69 | 70 |
|---|---|---|---|---|
| 16 SYMBOLS | 2032 SYMBOLS | 12 SYMBOLS | 2032 SYMBOLS | 4 SYMBOL |
| GUARD TIME | R-PACKET (MASTER) | GUARD TIME | R-PACKET (SLAVE) | GUARD TIME |

R-FRAME FOR RESPONDING STATION 71

| 72 | 73 |
|---|---|
| 1968 SYMBOLS | 64 SYMBOLS |
| NO DATA TRANSITION | SIGNALING |

R-PACKET 74

FIG.5

I-FRAME FOR INITIATING STATION 81

| 75 | 76 | 77 | 78 | 79 | 80 |
|---|---|---|---|---|---|
| 25 SYMBOLS | 220 SYMBOLS | 25 SYMBOLS | <20 SYMBOLS | 220 SYMBOLS | <20 SYMBOL |
| GUARD TIME | I-PACKET | GUARD TIME | DELAY | I-PACKET | RESIDUAL DELAY |

I-FRAME FOR RESPONDING STATION 86

| 82 | 83 | 84 | 85 |
|---|---|---|---|
| 45 SYMBOLS | 220 SYMBOLS | 25 SYMBOLS | 220 SYMBOLS |
| GUARD TIME | I-PACKET | GUARD TIME | I-PACKET |

I-PACKET 89

| 87 | 88 |
|---|---|
| 204 SYMBOLS | 16 SYMBOLS |
| DATA OR VOICE | SIGNALING |

FIG.6

SPREAD SPECTRUM POSITION DETERMINATION, RANGING AND COMMUNICATION SYSTEM

FIELD OF THE INVENTION

The invention relates generally to an improved technique to determine the operator position and distance to various features within a region such as a golf course or ski resort. Furthermore, the present invention provides voice and data communications between operators and a central station within the region.

BACKGROUND OF THE INVENTION

Position determination and communication systems have various applications. A preferred embodiment of the present invention would be as a golf course ranging and communication system. Golfers are frequently interested in knowing their distance to the pin or golf course obstacles from the tee or fairway locations. Skilled golfers, and in particular professionals, can control their shots to within a few yards of a desired target. Thus it is of considerable advantage to this class of golfers to be able to estimate their distance to the pin or other locations with very high accuracy from any feasible position of play.

Previous systems have relied on optical sighting systems, dead-reckoning systems, and RF-based systems. For example, in U.S. Pat. No. 3,868,692 issued to Woodward, a transmitter placed at each pin broadcasts a continuous wave RF signal. A hand-held unit measures the field-strength of the signal emitted by each pin and uses an analog meter to indicate yardage to the pin. This system is straightforward and simple, and allows the plurality of hand-held units to operate on a non-interfering basis, but requires the golfer to visually estimate yardage from an analog meter on the handheld unit. Accuracy can also be affected significantly by analog component tolerances and aging, as well as low levels of unexpected RF interference at the transmitter frequencies.

In a system to Henriques and Angleman (U.S. Pat. No. 4,297,701), a hand-held transceiver unit transmits a coded signal to a flagstick-mounted unit, which is itself, a transceiver. The flagstick unit is identified by the code, and the identified flag stick unit re-transmits the received signal back to the hand-held unit. Distance estimation is based on measuring the two-way signal delay between the hand-held and the flagstick units, which is implemented in the hand-held unit by charging and discharging of a capacitor. The system described above also suffer from the necessity to mount the transmitter or transceiver unit on or near the flagstick, where it may be easily damaged and is undesirable aesthetically, or may not be permitted. Another limitation of the system is that the signal transmission between the hand-held unit and the flagstick unit for a reliable distance measurement usually requires the two units to be in line of sight, which is not feasible in some positions within the golf course.

U.S. Pat. No. 4,698,781 issued to Cockerell and U.S. Pat. No. 4,703,444 issued to Storms et al. both describe a system in which hand-held transceiver operate in conjunction with a triangular arrangement of fixed-position transceivers (transmitters) which eliminate the need for flag-pole mounted units. Each hand-held interrogation unit stores the coordinates of key course features and fixed-position transceivers and can provide the golfer with an estimate of his distance to any of these features on a particular hole. In the system to Cockerell, the fixed-position transceivers contain either a clock or an interferometer to measure time of arrival or bearing from the mobile interrogator. The fixed-position transceivers then relay the time-of-arrival and/or bearing information to a central processor. In order to make accurate time-of-arrival measurement, the clocks at the three fixed-position transceivers are required to be synchronized in time such that precise time reference is available. Thus, high precision and stable clocks and constant calibration of the clocks are required. In the system to Storms, et al., three fixed-position transmitters transmit repetitive pulse sequences which are received and processed by the hand-held interrogation unit. The hand-held unit estimates the difference in the arrival time between the pulses transmitted by the first and second transmitters, and then the arrival time difference between the pulses from the second and third transmitters. Based on these two time-difference estimates, the hand-held unit computes it's current location and then computes and displays the distance to the desired course feature. In this system, the fixed-position transmitters need to be synchronized in time. Thus, high precision and stable clocks and constant calibration of the clocks are required.

The spread spectrum ranging and direction-finding system issued to Wang, et al (U.S. Pat. No. 5,056,106) employs four fixed position reference transmitters and a handheld receiver. The handheld receiver measures pseudo-range from the four reference transmitters and performs triangulation to determine its position. A hierarchical master-slave synchronization scheme is used to synchronize the clock of the reference transmitters. This hierarchical master-slave synchronization scheme occupies a large amount of radio spectrum. The noise-induced error in this timing synchronization tends to accumulate and propagate from upper hierarchical reference transmitters to lower hierarchical reference transmitters, thereby limiting the accuracy of the positioning function.

Golf course positioning systems by Huston et al (U.S. Pat. No. 5,364,093), Fraker et al (U.S. Pat. No. 5,434,789), and Boman (U.S. Pat. No. 5,469,175) incorporate a Global-Positioning System (GPS) receiver in a mobile unit to determine the golfer's location and the distance to the pin. The available accuracy of the (CA-code based) Global Positioning System is limited by the Selective Availability to 100 meters. To increase the accuracy of such systems, a fixed-location reference base station for determining the inaccuracy of the Global-Positioning System receiver and for periodically broadcasting differential-correction information to the mobile unit is installed on the golf course. Since the mobile unit of such differential GPS-based systems requires a GPS receiver and a separate receiver for receiving the differential correction in addition to a data processor, the hardware cost is quite high and hardware and the battery required can make such mobile unit quite heavy.

The system described in U.S. Pat. Nos. 5,526,357 and 5,365,516 issued to Jandrell uses time-division spread spectrum-signaling technique for communication and transponder locationing. The system contains a control center, an array of networked base stations, and a plurality of transponders. The system employs the hierarchical mater-slave synchronization technique in which the control center disseminates timing pulses for the synchronization of the time-bases of the networked base station. The base station then disseminates timing pulses to adjacent regions. Similar to the ranging and direction finding system by Wang et al, such network-wide time-base synchronization requires significant amount of bandwidth and the accuracy of the positioning is plagued with error propagation problems associated with the hierarchical master-slave timing synchronization system. In the CDMA communications and geolocationing system by Schilling (U.S. Pat. Nos. 5,365,544 and 5,506,864), the ranging between a plurality of base stations and remote units is achieved with a common type of echo ranging measurement method that is used in radar systems. The system determines the range between a base station and a remote unit, but not the position of the remote unit, or the distance to any of the pre-defined feature.

Therefore, none of the prior art systems listed on golf courses combine a position location system with voice or data communication capabilities. Conversely, the prior art spread spectrum communication systems would be difficult to use on a golf course.

SUMMARY OF THE INVENTION

The present invention describes a system which adapts time-division, direct-sequence spread spectrum ranging techniques in a novel application to position and range determination and two-way communication. Specifically, the present invention allows a plurality of operators to determine their position and distance to a set of predetermined features with greater accuracy and reliability than previously achieved, without interference from each other, using a number of fixed-position reference stations, a fixed-position central station, and a handheld or otherwise mobile apparatus of moderate complexity and low cost. The mobile apparatus can also be used for direct voice communication with another mobile apparatus or central station and to send data messages to specific destinations within the region. The light weight electronic mobile apparatuses are equipped with a keyboard and display for users to select a pre-defined feature to display range information, to display the determined distance, other information, and to store operator-based data.

In the preferred embodiment, a set of fixed-position spread spectrum reference station are strategically placed at various points within the boundaries and/or near the perimeter of an operating region such as a golf course, being positioned to maximize the accuracy of the system for a particular region. The reference stations, each assigned a unique ID, are not required to be synchronized in time and are normally operating in a receive-only mode. The mobile apparatus carried by the operator first selects a set of reference stations based upon the predetermined feature to which the distance is to be measured. The mobile apparatus interrogates the selected reference stations one at a time, by broadcasting a direct sequence spread spectrum signal carrying the ID of the selected reference station. The interrogated reference station then establishes a communication link with the mobile apparatus. The mobile apparatus and the reference station measure the time difference in the PN code epoch of the respective received signal and the epoch of a local (free-running) PN code. The hardware group delay, internal processing delay, and the error produced by the clock frequency offset between the mobile apparatus and the reference station can be characterized precisely, using novel estimation techniques and subtracted from the time difference measurements in the mobile apparatus and reference station. The time difference measurement in the reference station is transmitted to the mobile apparatus. The two time difference measurements are combined to yield the round-trip propagation delay between the mobile apparatus and the selected reference station. The position coordinates of the selected reference station is also transmitted to the mobile apparatus. This procedure is repeated between the mobile apparatus and other selected reference stations. These round-trip delays to the selected reference stations are then incorporated into an algorithm based on a hyperbolic multilateration principle to determine the mobile apparatus's position in two or three dimensions. The round-trip delay measurements to at least three reference stations are required to determine the three-dimensional position coordinates of the mobile unit. If round-trip propagation delay to more reference stations is available, the estimated position error (the so-called geometric-dilation of precision) can be reduced.

The preferred embodiment uses direct sequence spread spectrum signaling with code-division among the reference stations to allow the plurality of reference stations to operate on a non-interference basis. The use of spread spectrum signaling and the ability to utilize a lager number of reference stations can be seen to provide the capability for much higher accuracy than prior art systems. The mobile apparatuses as well as the reference stations operate in a time-division duplexing (TDD) scheme. In this scheme, time is divided into frames. In each frame, there are two or more time slots. The mobile apparatus (the reference station) transmits during an assigned time slot and receives signals from a reference station (the mobile apparatus) during the other time slot in the time frame. The transmit and receive signal is at the same RF center frequency, without the possibility of interference between the transmitter and receiver. To avoid interference between different mobile apparatuses, some of the transceiver channels can be frequency separated, which may aid a frequency selective mobile unit in reducing possible near/far problems that might occur for some positions in the region if a single channel, code-division only system is used.

The direct-sequence spread-spectrum nature of the reference transceiver signal also conveniently supports data transmission capability. The digital modulating stream which phase modulates the transmit signal carrier is derived from both the PN coder output and the lower rate data message stream. The PN code data rate or chip rate is much higher than the data rate so that the spread-spectrum property of the reference transceiver signal is preserved. This feature allows a data message stream to be transmitted as part of the spread spectrum signals. In a golf course setup, these data message would normally include such information as the number of holes for the golf course, a pre-defined list of other golf features, ID of the preferred set of reference stations to be used for distance determination to a particular feature, the coordinates of the reference stations, course features, voice and message to the golfers. In general, any data which is required by the mobile units and which is specific to a particular operating region could be provided in the course data message. The spread-spectrum transceiver of the mobile apparatus, which can demodulate and store in processor RAM the data from any signal, is then able to be configured automatically for any geographical region equipped with the present system. In practice, the mobile apparatus would be "loaded" with the particular data prior to the start of operation, by interrogating and receiving the signal from one reference station or the central reference station for an extended period of time, during which all the specific data for the region is demodulated and stored in the memory of each mobile apparatus. Re-loading of the mobile apparatus would then only be required due to power disruption or other events which would affect the hand-held unit's RAM. Alternatively, the mobile apparatus is "loaded" with data relating to a particular feature on an as-needed basis to reduce the requirement for a large volume RAM. In this case, the smaller amount of data is "loaded" during each or some distance requests.

Each mobile apparatus is equipped with a microphone, speaker, and voice codec. The codec converts the voice signal from the microphone into digital data. The digitized voice data is transmitted to the other mobile apparatus as data in the spread spectrum signal. When the receiving mobile apparatus receives the digitized voice data, it converts the data back to an analog voice signal and feeds it to the speaker. This allows voice to be communicated from one mobile apparatus to other mobile apparatus. During the receiving time-slot of the time-division duplex time frame, the voice data is stored in a buffer and transmitted at a rate higher than twice the rate the voice data is generated by codec. The delay associated with buffering of voice data is be minimized by reducing the length of the transmit and receive time slots by arranging the way the data is stored into the buffer and transmitted out. When two mobile stations engage in voice communication, they typically switch to a different frequency channel and different PN code to avoid the long voice communication from occupying the frequency which is used by other mobile apparatuses or reference stations.

The mobile apparatus or central station is capable of transmitting data messages to specific locations within the region. Each transceiver in the mobile apparatus, central station, and reference stations is assigned a specific ID. The mobile apparatus transmits a signal carrying the ID of the destination and the data message to a selected reference station based on its current location. A routing table in the reference station allows the reference station to look up the next station to relay the data message based on the received destination ID. The reference station then re-transmits the received data message to the next station. The implementation of the routing table can be quite flexible depending on the memory and the amount of processing available in the reference station. This can be accomplished by minimizing the number of relay stations, or by relaying the data message back to the central station and then to the desired location. Because the reference station is typically installed in an elevated position, the mobile apparatus is capable of relaying the data message to another mobile apparatus not directly in the line-of-sight. The data message to be broadcast to the whole region is routed to all the reference stations in the region.

In order to satisfy various requirements, signal parameters such as chip rate, PN codes, data rate, frame duration, and packet format are allowed to varied. The preferred embodiment of the spread spectrum transceiver makes it easy to achieve various functions of the present system using digital implementation of the correlator portion of the spread spectrum transceiver employing current VLSI technology. All the transceivers within the region typically employ a common frequency channel and a common PN code in the initial mode of operation to simplify signal acquisition. To aid initial signal acquisition in the transceivers, a long preamble followed by a unique word, IDs and data message is employed. The long preamble allows the receiver to sequentially process the signal acquisition operation, thereby simplifying the receiver hardware requirements. A unique word is used to establish packet timing. A transmitting station ID and destination ID allows the data message to be routed to the desired station. For typical data message transmission, the data message transfer is accomplished in one acquisition frame. This minimizes the interference to other transceivers. Once the communication link has been established with the acquisition frame, the transceiver can immediately use other PN codes or frequency channel to avoid interference and switch to other types of TDD frame formats for ranging or voice communication. To perform the ranging, a different frame format designed for ranging is employed. This ranging frame format allows the PN code tracking error to be minimized. Another TDD frame is designed for voice communication. The data rate in the voice signal format is substantially higher (at least twice the codec data rate) to support the voice data and the voice delay due to the minimization of buffering. The voice communication session is substantially longer than data message or ranging session. Thus, the transceivers switch to a different PN code and frequency channel during the session.

Since the mobile apparatus used by the golfer performs all distance measurement functions and also is automatically configured for each course by demodulating and storing the course data message, system operation is fully automatic. The reference stations can generally be placed in aesthetically non-impacting areas and on existing structures such as light posts or other existing elevated structures in the proximity of a region. Reference station positions are only restricted to the extent they may affect position location accuracy due to their geometry.

A novel feature of the present system is its ability to provide both ranging and communication functions. This feature distinguishes the present invention form other "ranging-only" or "communication-only" systems and greatly enhances the utility of the present invention.

A basic advantage of the present system over prior art systems is the use of direct-sequence spread spectrum signals for pseudo-range or delay measurement and reference transceiver's synchronization. This provides the capability for most of the benefits of spread spectrum signaling, including much higher and reliable accuracy than simple pulse, phase comparison, dead-reckoning, or power level measuring systems. Spread spectrum signaling also provides the benefit of commercial unlicensed operation in certain bandwidths, for transmit power up to 1 Watt, under FCC Part 15 rules. The direct-sequence spread spectrum signal design also easily supports a data transmission capability, which allows automated configuration of the mobile unit for each golf course. In addition, the choice of signal parameters such as chip rate, code length, data rate, and packet format in the present system are chosen to allow substantially digital implementation of the spread spectrum signal and data demodulation functions. This generally provides the benefit of substantially more reliable and precise pseudo-range or delay measurement capability compared to analog approaches, which translates too much more accurate and repeatable distance determination accuracy. The use of flexible format enables a low cost transceiver to be used without sacrificing functionality.

An additional advantage of the present system is the time-division feature of the spread spectrum signal from each reference transceiver. This feature allows the plurality of reference transceivers to transmit at only one frequency if required, substantially reducing the radio frequency bandwidth required for the system.

Another advantage of the present scheme over the prior art is the possibility of using a single center frequency for different reference stations. The implementation of the mobile apparatus can be realized with a common analog RF processing front end and multi-channel digital receiver. Thus, substantial miniaturization and cost sizing can be realized. In addition, the multi-channel receiver also provides much faster position estimate.

Another advantage is the use of both frequency division and code division among the reference transceivers, which enables spread spectrum tracking and data reception from the selected transceiver with minimal interference from other reference transceiver signals. This also allows a large number of transceivers to operate simultaneously with low mutual interference between transceiver signals and increases the capability to deploy more reference transceivers to avoid signal blockage and/or multipath due to foliage or course topography.

An additional advantage of the present system is the elimination of the high precision and reliable clock in each reference transceiver which is usually a high cost item and requires costly tuning and adjustment.

Although this invention has been described with respect to its utilization on golf courses, it would have equal applicability to ski results. Skiers who get lost or hurt skiing would need to signal for help. A system which allows the skier to determine his position and signal for assistance from the resort operator would be of considerable safety value and can assist the rescuers to quickly locate the injured or lost skier.

Additional benefits and advantages of the present system for locationing and communication will become apparent in the detailed description and preferred embodiments.

BRIEF DESCRIPTION OF THE DRAWINGS

FIGS. 4, 5, 6 shows the S-Frame and S-Packet, R-Frame and R-Packet, I-Frame and I-Packet, respectively;

DETAILED DESCRIPTION OF THE INVENTION

Figure 1:
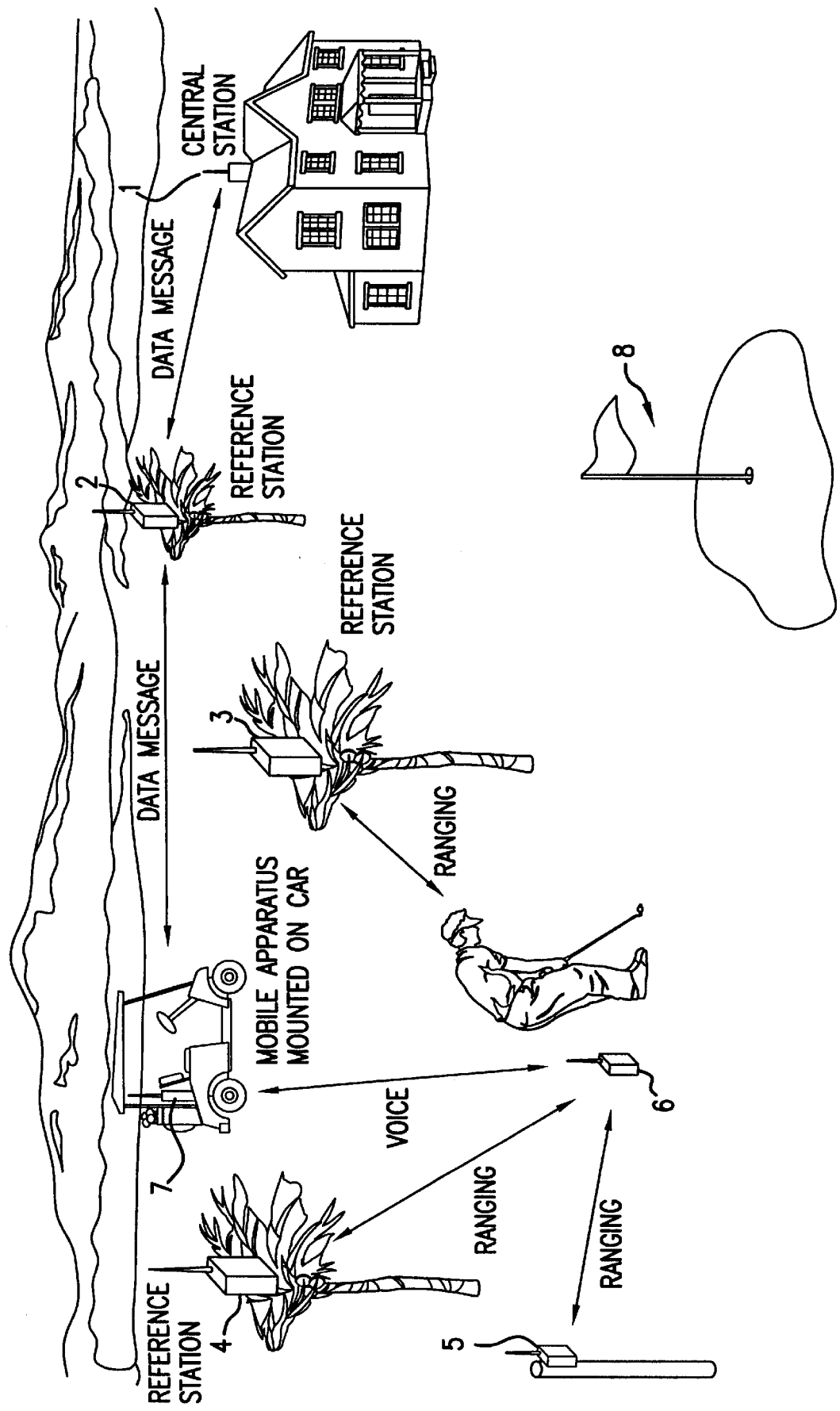
FIG. 1 is a diagram showing the key elements and a representative layout of the system.

FIG. 1 shows a preferred embodiment system architecture of the present position determination and communication system in an example region such as a golf course, with an example arrangement of the central station 1, four reference stations 2, 3, 4, 5, located at various positions on the golf course, two hand-held or otherwise mobile apparatuses 6, 7, and a feature 8, such as a flagstick at which a golfer is aiming. Although FIG. 1 shows four reference stations for illustration, more reference stations may be employed to maintain accurate distance determination capability over all feasible locations within the region. The entire set of reference stations for a particular region is located at various positions such that, for each accessible position within the region, the mobile apparatus can select at least three reference stations whose geometry relative to the receiver minimizes blockage and/or multipath effects, and minimizes other contributors to position location inaccuracy such as the geometry of the reference stations relative to the mobile apparatus, which introduces a receiver position determination inaccuracy commonly called the position dilution of precision (PDOP). It is noted that once an operator of the mobile apparatus selects a particular feature to which he desires a range estimate, the mobile apparatus automatically selects a set of three reference stations to provide the distance estimate to the particular feature. However, the mobile apparatus may also be provided with the capability to determine if the particular set of stations used gives a poor distance calculation because of high PDOP, and may therefore choose one or more additional reference stations to use for the references with which it determines it's present position and the distance to the selected feature.

Once the operator chooses the feature to range to, the mobile apparatus retrieves from its memory the preferred set of three reference stations to use with that feature. Additional information needed includes the three-dimensional coordinates of the reference stations selected, the three-dimensional coordinates of the feature, an initial guess of the mobile apparatus position which can be selected based on the selected feature to range to. This additional information can be loaded into the mobile station as part of data carried by the signal during initialization of the mobile apparatus or transmitted from any of the reference stations during the range measurement. In some portion of the region where the terrain is flat, a fixed elevation coordinate can be used in the range estimation. In this case, only two reference stations are required to perform the ranging estimate.

Each reference station 2,3,4,5 has the capability to receive and transmit a data bearing, time-division direct-sequence spread-spectrum signal during non-overlapping receive and transmit time slots. Thus each reference station normally employs a spread-spectrum transceiver, which performs the functions of PN code acquisition, and tracking, carrier frequency and phase tracking, receive and transmit time slot synchronization, and data detection. The reference station spread spectrum transceiver also generates the transmit PN code, formats, and buffers the data message to be transmitted, modulates the PN code plus data onto the carrier frequency to become the spread spectrum signal and maintains the transmit time slot timing.

In the preferred embodiment, each spread spectrum transceiver should be capable of changing the parameters such as PN code, data message packet format, TDD slot timing, and data rates. In practice, all reference stations normally operate in a receive-only mode at a common carrier frequency and with a common PN code. In this receive-only mode, the reference station tries to acquire PN code timing, carrier frequency and phase, data symbol timing, and TDD timing, of any incoming signal. Once PN code timing of the selected receive signal is being tracked, received time slot timing has been established, and the data message has been demodulated and the necessary data interpreted and stored in processor's memory at the reference station, the reference station can immediately respond by transmitting it's data-bearing spread spectrum signal. The spread spectrum signal is transmitted only during a time slot whose timing is derived from the tracked receive signal time slot and which does not overlap the receive slot. Once initial communication has been established in the first TDD frame, subsequent communication follows the transmit and receive time slot of the TDD timing. The reference station identifies if the received spread spectrum signal is intended for itself by comparing the ID carried in the signal with its own ID.

The spread spectrum signal transmitted during the transmit time slot is modulated by a pseudo-noise code sequence whose timing is derived from and precisely synchronized to the timing of the received pseudo-noise code sequence. To avoid interference in the common carrier frequency channel, the reference station can switch to a different frequency channel and PN code after initial communication has been established in the first TDD frame. If the reference station receives a data message that needs to be relayed, it can also initiate communication with another reference station, central station, or mobile apparatus. The reference station derives its power from either solar cell, battery, or various types of power supplies. To conserve power, the reference station has the capability to go to a non-active power saving mode at the request of the central station (for example, the system can be shut down during the night) and return to its normal operation sometime later.

At least one central station 1 is provided for each system. The central station has one or multiple spread spectrum transceivers and a computer. The spread spectrum transceiver of the central station is capable of transmitting and receiving functions such as PN code, acquisition and tracking, carrier frequency acquisition and phase tracking, data detection, TDD timing synchronization, generation and transmission of a data-bearing spread spectrum signal. In the preferred embodiment, the spread spectrum transceiver in the central station is capable of changing the parameters such as PN code, data message packet format, TDD slot timing, and data rates. In normal operation mode, the transceiver in the central station is in a receive-only mode at a common carrier frequency and with a common PN code trying to acquire the incoming signal. The transceiver in the central station is capable of immediately responding to the received signal by transmitting a spread spectrum signal with timing synchronized to the epoch of the receive PN code. Once the communication has been established in the first frame, subsequent communication follows the transmit and receive time slot of the TDD timing. The central station identifies that the incoming signal is intended for itself by comparing the ID carried in the signal with its own ID. The transceiver in the central station can also initiate a communication link with a reference station or mobile apparatus. To initiate a communication, the central station transmits a data bearing spread spectrum signal using the common carrier frequency and PN code. The central station then tries to acquire the responding incoming signal at the second half of the TDD frame to establish communication.

The transceiver in the central station is connected to a computer via a two-way data carrying cable or wire. Special purpose software in the computer would allow system maintenance personnel to monitor the status of the system and to update reference station memory database, coordinates of various features on the golf course whenever any of these items are re-positioned, to collect the data received in the transceiver, and to transmit data message to certain reference stations or mobile apparatuses. The computer also stores a routing table for each reference station. If any of the reference station fails, the computer can generate an alternate routing table for each reference station. This data would then be broadcast as part of the course data message to all reference stations until further changes. Other functions for managing the system can be easily developed in the computer software.

Each mobile apparatus 6, 7 has a spread spectrum transceiver which is capable of transmit and receive functions such as PN code acquisition and tracking, carrier frequency acquisition and phase tracking, data detection, TDD timing synchronization, generation and transmission of a data-bearing spread spectrum signal. In the preferred embodiment, the spread spectrum transceiver in the mobile apparatus is also capable of changing the parameters such as PN code, data message packet format, TDD slot timing, and data rates. In normal operation mode, the transceiver in the mobile apparatus is in a receive-only mode at a common carrier frequency and with a common PN code trying to acquire the incoming signal. The transceiver in the mobile apparatus is capable of immediately responding to the received signal by transmitting a spread spectrum signal with timing synchronized to the epoch of the receive PN code. Once the communication has been established in the first frame, subsequent communication follows the transmit and receive time slot of the TDD timing. The mobile apparatus identifies that the incoming signal is intended for itself by comparing the ID carried in the signal with its own ID. The transceiver in the mobile apparatus can also initiate a communication link with a reference station or mobile apparatus by transmitting a data bearing spread spectrum signal using the common carrier frequency and PN code. The mobile apparatus then tries to acquire the responding incoming signal at the second half of the TDD frame to establish communication.

In the preferred embodiment, the mobile apparatus is provided with two man-machine interfaces, one for input and the other one for output. The input portion would include a keyboard or other information input device such as voice recognition device for indicating the feature the operator is concerned with, the distance to, for initiating a voice communication with another operator of mobile apparatus, and for entering and initiating a data message to be transferred to a specific location in the region. The output interface would include a display or other type of machines to man interface such as a voice synthesizing device for providing either alphanumerical data or graphic or a voice message. Once the operator has input his distance request into the mobile apparatus, the apparatus would process this request, and based upon the information received from the reference stations, the operator's position is determined and the distance from this position to the particular target or geographic location is computed and output through either a display or voice synthesizer. The man-machine interface and the memory in the mobile apparatus can be used to store and display information of the region. In a golf course setting, this information would include the par number of each hole, various features and obstacles of each hole, description of the green, or other information that is relevant to golfer. It can also be used to store the golfer's score and display the data message received. With a graphical display, the terrain and features of each hole can be displayed through the mobile apparatus.

The operator of the mobile apparatus 6 initiates a range measurement to a specific feature (such as a pin 8 in a golf course) in the region. The mobile apparatus has in its memory a table which associates each feature with a set of three reference stations. The mobile apparatus transmits an initiating TDD, data bearing spread spectrum signal to one of the reference stations requesting a range measurement to the selected feature in the region. The reference station responds by immediately sending a spread spectrum signal in the second time slot within the TDD frame to the mobile apparatus making the initial request, transmits the location coordinates of the reference station and the coordinates of the selected feature. The mobile apparatus and the reference station immediately switch to a different carrier frequency channel, different PN code, and a different TDD frame structure at the start of the following TDD frame. This new TDD frame is specifically designed to optimize the accuracy in the range measurement. Several of the ranging TDD frames are used for range measurement. During the respective transmit time slot in the reference station and the mobile apparatus, the PN code tracking error increases (drifts off) at a rate equal to the frequency difference of the PN code in the received signal and the local receive PN code generator within the spread spectrum transceiver. Thus, the tracking error is typically greater at the beginning of the receive time slot.

The bandwidth of the PN code-tracking loop in the spread spectrum transceiver is proportional to the square of the static state PN code tracking error. The bandwidth of the PN code-tracking loop is selected such that the static state error meets the accuracy requirements of the ranging measurement. The length of the TDD time slot is selected such that the receive time slot is approximately two to three times the time constant of the PN code tracking loop. This allows the PN code tracking error to be reduced during the receive time slot. The pseudo-range measurement is performed in the spread spectrum transceiver near the end of the receive TDD time slot. Several consecutive pseudo-range measurements are performed at both the mobile apparatus and the reference station near their respective receive TDD time slot. Two factors affect the accuracy of the pseudo-range measurements: 1) hardware delay, due to the group delay in the analog circuit as well as the processing delay in the digital circuit, 2) clock drift error, occurs because the pseudo-range measurements are not performed simultaneously at the reference station and the mobile apparatus. These two factors are computed and compensated from the pseudo-range measurements by the procedure to be described in more details later. The reference station transmits its pseudo-range measurement to the mobile apparatus. The mobile apparatus combined the two pseudo-ranges to obtain the round trip propagation delay between the mobile apparatus and the reference station. Once this is obtained, the mobile apparatus initiates the range measurements with the other two selected reference stations following the same procedure. When three range measurements are obtained, the mobile apparatus uses hyperbolic multilateration principle to solve its current position.

The mobile apparatus starts with an initial guess of its position, which is typically at the most probable position based on the feature selected. The mobile apparatus uses an algorithm based on the least square principle to obtain successive refinements of its position estimate using the range measurements. The mobile apparatus also computes the PDOP and determine if its position estimate is accurate enough. If the mobile apparatus obtains a high PDOP, it can request range measurement to an additional reference station to range to. It then performs the range measurement with the new set of reference stations and uses the new range estimates in its position computation algorithm. When the mobile apparatus obtains its position estimate, its then computes the distance to the selected feature using its position coordinate and the coordinate of the selected features.

FIG. 1 also illustrates an embodiment in which the mobile apparatus 6, 7 (one carried by golfer and the other one mounted on golf cart) can engage in direct voice communication with each other. When an operator desires a voice communication with another operator, he pushes the "talk" button on the keyboard of the mobile apparatus and then enters the ID of the desired mobile apparatus to page him. When the other mobile apparatus receives the paging signal, it generates an audio output, such as a buzzing sound to inform its operator. The mobile apparatus then sends a responding signal to the paging mobile apparatus after its operator pushes the "talk" button. Once the two mobile apparatuses establish the communication in the first TDD frame, the two mobile apparatuses switch to a different carrier frequency and PN code to minimize the interference and employs a new TDD frame structure designed for the voice communication at the start of next TDD frame. Each mobile apparatus is equipped with a voice codec, microphone, and speaker. The voice codec on the mobile apparatus is activated when the mobile apparatus switches to the voice TDD frame. The codec translates the analog voice signal from the microphone into the digital data. The voice data is modulated onto the spread spectrum signal and transmitted to the other mobile apparatus. When the mobile apparatus receives the voice data, it uses the codec to translate it into an analog voice signal which drives the speaker to generate a voice replica. The codec generates the voice data on an average rate of 64 kbps (if using PCM codec, or 32 kbps if using ADPCM code). The spread spectrum transceiver in the mobile apparatus only transmits during the transmit time slot. The voice data is stored in the transceiver memory during the non-transmitting period. This buffered voice data as well as the newly generated voice data during transmit time slot is then transmitted during the transmit time slot. The transmission data rate should be greater than twice the codec rate so that the voice data does not accumulate in the transceiver memory-causing buffer overflow. The data rate depends on the codec rate, the overhead data, and the TDD time structure which includes transmit, receive, as well as guard time slots. The voice TDD frame design should keep the frame duration sufficient short such that the delay in the voice replica is not detectable by human ear. The voice TDD frame, however, should not be too short such that the transmit data rate becomes very high.

The mobile apparatus 6, 7 can be used to send data messages to a selected location in the region. Examples of such usage in a golf course setting includes ordering food and beverage from a mobile vender within the course, instant tournament score reporting back to the club house, and inquiring the group of players which are not within line of sight of the operator of the mobile apparatus if they are out of the driving distance. FIG. 1 also illustrates that a mobile apparatus 7 sends a data message to the central station. If the mobile apparatus 7 is not in line of sight of the central station 1, it sends the data message to a selected reference station 2 and the reference station 2 relays the data message to the central station. The operator of the mobile station selects the reference station to relay the data message by entering the particular location that he/she is currently at. The mobile apparatus automatically selects a default reference station from its memory for that particular location and transmits the data message to the selected reference station. The mobile apparatus also attaches its ID and the destination station ID to its signal. The reference station carries in its memory a routing table. The destination ID received by reference station allows it to look up the next reference station to relay the data message to. By relaying through a number of reference stations the data message can be transmitted to any destination within the region. If the mobile apparatus does not specify the destination ID, the data message will be broadcast to the whole region. The data message to be relayed can also originate from the central station instead of mobile apparatus.

Figure 2:
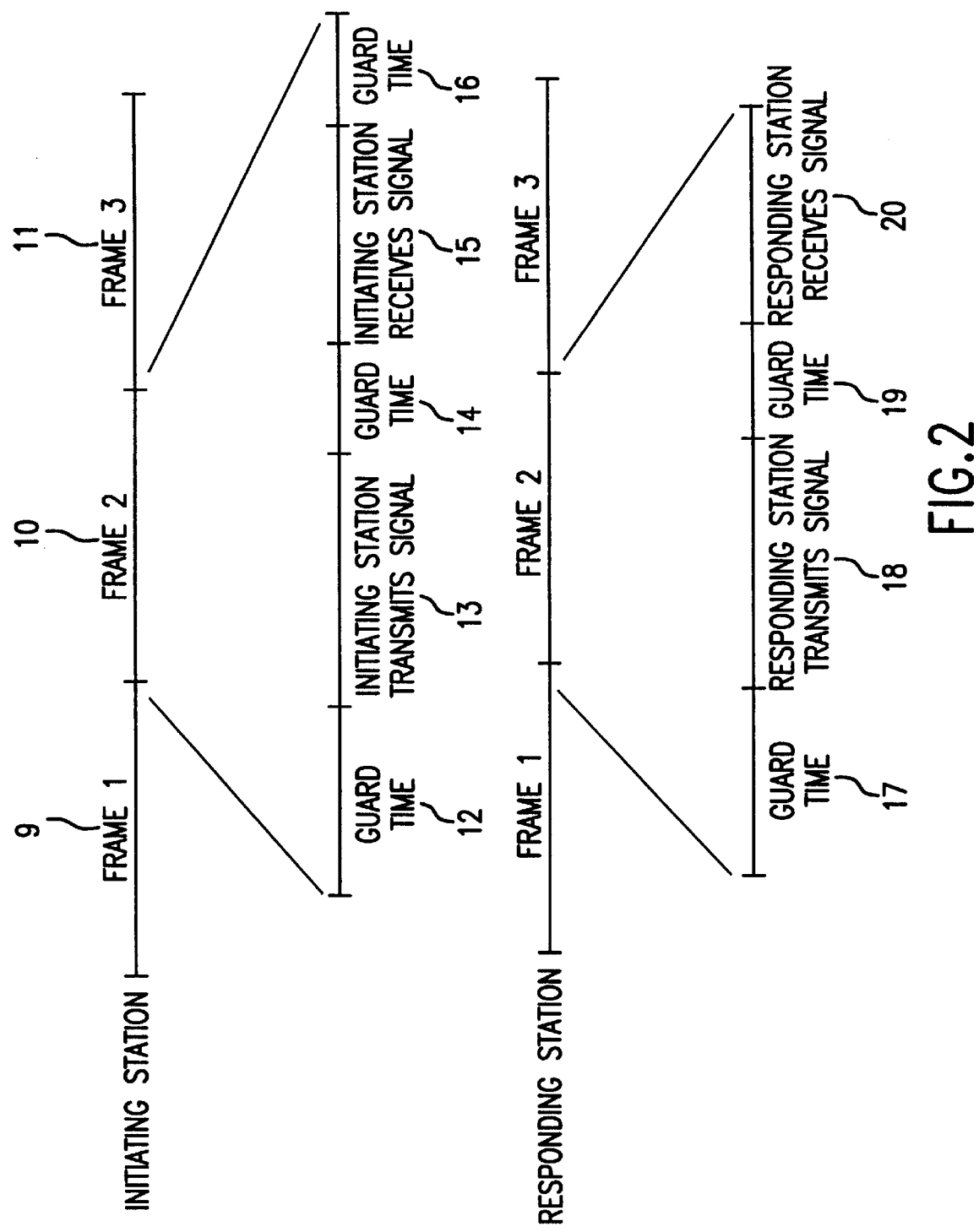
FIG. 2 shows the time-division duplexing (TDD) frame structure.

The central station, reference station, or mobile apparatus, which initiates the communication with the other station or mobile apparatus, will become the timing reference for itself and the other station. An example embodiment of the TDD (time-division duplexing) frame structure is depicted in FIG. 2. As shown in FIG. 2, time is divided into frames 9, 10, 11. The initiating station transmits a signal to the responding station during the first half of a frame 13 and receives a signal from the responding station during the second half of a frame 15. Conversely, the responding station receives a signal from the initiating station during the first half of the frame 18 and transmits a signal to the initiating station during the second half of the frame 20. As part of the frame structure, guard times 12, 14, 16, 17, 19 between signal transmission and reception are provided to allow time for hardware switching and settling. Hardware switching includes the switching of transmit to receive mode or vice versa and switching of the frequency channel. It should be noted that in the receive-only mode of operation, the receiver is on all the time until it acquires the frame timing of the received signal. Once the receiver acquires the frame timing of the incoming signal, it establishes the TDD frame timing structure and follows the TDD timing in the subsequent frames.

Because each station or mobile apparatus transmits it's signal in a time slot which does not overlap its receive time slot, there is no self-interference from the spread-spectrum transmitter of a station or mobile apparatus into the receiver of the same station or mobile apparatus. When the transmitter has it's direct-sequence spread-spectrum transmission gated on, the receiver of the same station or mobile apparatus is not receiving and thus can be turned off for the transmit time slot period. In the preferred embodiment of the present invention, a single-pole- double-throw RF (radio frequency) switch is switched into the transmit front end of the reference transceiver during the transmit time slot to prevent strong transmit interference from entering the radio frequency analog circuitry of the receiver. On the other hand, the RF switch is switched to the receiver front end during the receiving time slot. The transmit power amplifier is gated off during the receive time slot to avoid interfering with the receiver operation.

In the example embodiment, the data clock pulses in each frame consists of multiple of clock pulses at the PN code-chipping rate. The data clock pulses are, for convenience, chosen to be an integer number of PN code chip periods. As is well known in the art, the basic integration period in which the received and local code are cross-correlated in a direct-sequence spread spectrum receiver in which data is also modulated onto the signal, must be less than or equal to the symbol period in order to minimize the effects of data transitions on the code correlation computed during code acquisition and tracking. The simplest way is to choose the code correlation time in the receiver to be the same as the data clock pulses. The frame duration is adjustable in integer multiple of data clock pulses depending on the mode of system operation. A frame counter clocked by the bit clock is used to keep track of the frame timing and used to trigger various control signals.

The initiating station provides the overall system timing reference. The initiating station has a transmit and a receive frame counter whereas the responding station only needs one active frame counter. The initiating station transmit frame counter is tied to the free-running initiating station oscillator. The receiver frame counter of the initiating station, on the other hand, is tied to the bit clock derived from the received signal. The frame counter of the responding station derives its bit clock from the received signal. The difference in the values of the initiating station transmits and receives frame counters thus reflects the propagation delay between the two stations.

In addition to avoiding the interference between the transmitter and receiver, a power management feature allows for most efficient use of the solar or battery power. This feature is implemented by using control signals to gate the power to different sections of the spread spectrum transceiver. These control signals are generated by comparing the frame counters against a set of values. In the preferred embodiment to account for different TDD timing structure, timing of the control signals is programmable.

Figure 3:
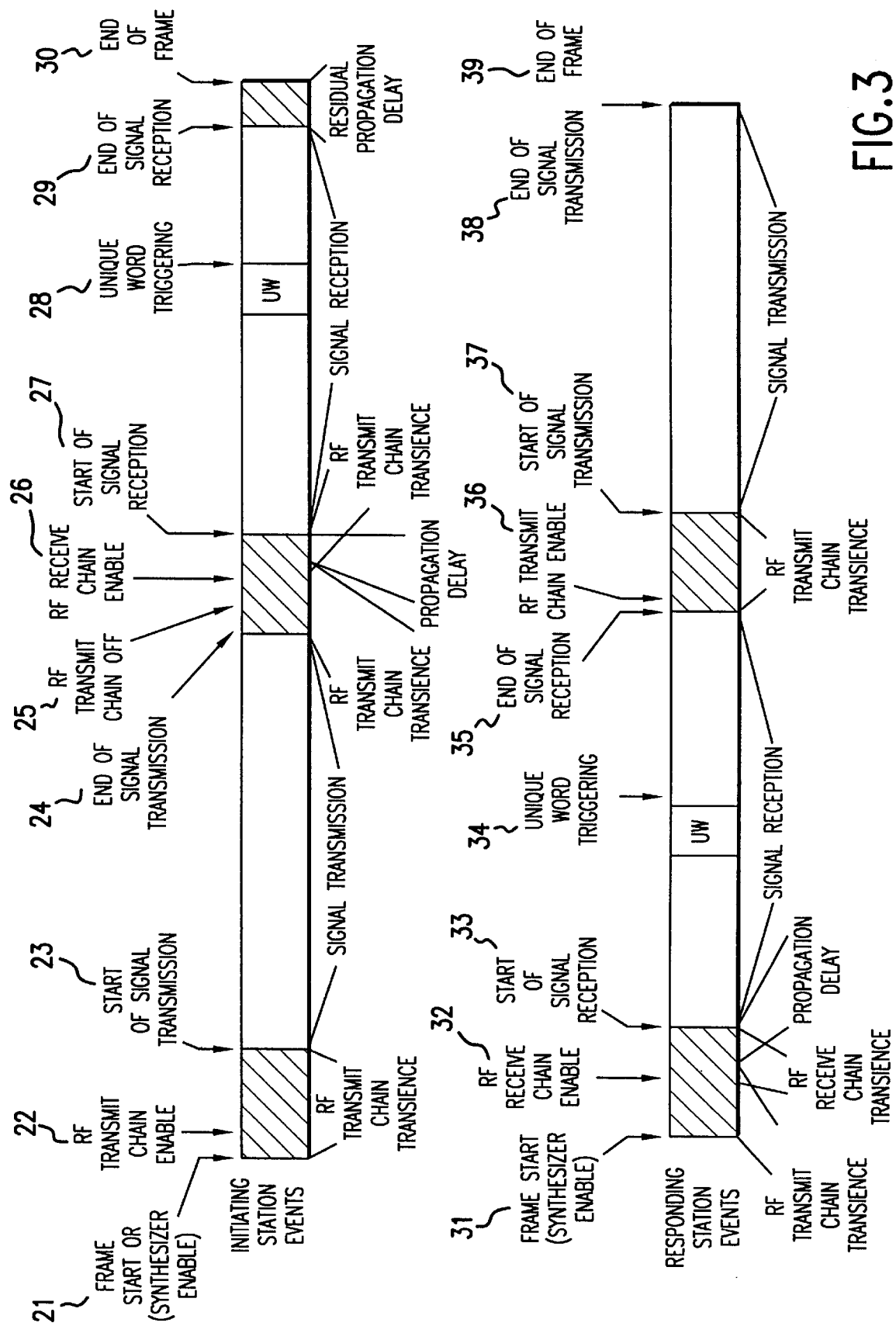
FIG. 3 shows the various events during a TDD frame.

The critical events associated with end-to-end communications that must be timed and controlled at both the initiating and the responding station during a frame is illustrated in FIG. 3 and are summarized as follows:

Frame Start (and Channel Switching) 21,31
RF Transmit Chain Enable 22, 36 and Stop 25, 38
RF Receive Chain Enable 26, 32 and Stop 29, 35
Start 23, 37 and Stop of Signal Transmission 24, 38
Start 27, 33 and Stop of Signal Reception 29, 35
Unique Word Triggering 28, 34

For the initiating station, the frame start timing coincides with the leading edge of the first (0th) frame counter clock in a frame time denoted by reference numeral 21. The frequency channel switching is not performed during the first TDD frame. It is, however, necessary to switch frequency channel to avoid interference between different users using the same frequency. The frequency channel switching, if required, also occurs at the start of the second TDD frame. The channel switching is performed by reprogramming the synthesizer to a different frequency. This is done by reloading the synthesizer with a new channel value and then enabling the synthesizer to switch frequency by a control pulse signal. Since it takes some time to program the synthesizer and for the VCO (voltage-controlled oscillator) to settle to the new frequency. In general, it is necessary to make the synthesizer settling time as short as possible through careful design of the RF circuitry.

Before the initiating station can begin to transmit signal, the active elements in the transmit chain of the RF circuit need to be turned on and a TR (transmit/receive) switch in the RF circuit needs to be configured for transmission. The control signal to enable the transmit chain must precede the actual signal transmission by a long enough interval such that the active elements in the RF transmit chain can ramp up to their steady state. Any possible coupling between the active elements in the RF and VCO must be taken into account so that any frequency transient due to transmit/receive switching has subsided by the time signal transmission begins. Once this interval has passed, the signal transmission as indicated by reference numeral 23 commences when the synthesizer settles on a new frequency and all the active elements in the transmit chain of the chain of the RF circuit stabilizes. This signal transmission would last until the end of the signal transmission 24. When the initiating station finishes transmitting the signal, it disables the transmission. The control signal for the RF transmit chain should then be turned off a short time after the end of signal transmission to allow the modulated signal to propagate through the RF section.

When the power supply to the active components in the RF transmit chain are shut off 25, the transient response can affect the initiating station's signal reception either through the coupling between the power amplifier, pulling of the synthesizer VCO, or the residual output power from the transmitter power amplifier still saturates the RF receive chain. Enough guard time between the end of signal transmission and the beginning of the signal reception needs to be reserved.

Before the initiating station can begin to receive a signal, the active elements in the receive chain must be turned on and the TR switch needs to be configured for reception is indicated by reference numeral 26. The RF Receive Chain Enable needs to allow sufficient time ahead of the actual signal reception such that the active elements in the RF receive chain can stabilize. The actual arrival time of the signal depends on the responding station's guard time and the propagation delay. The initiating station receiver timing is slaved to the responding station signal and has no direct control of the guard time between the end of the signal transmission and the arrival of the responding station signal.

During the signal acquisition, the control of the RF receive chain needs to allow for the earliest possible responding station signal arrival time (corresponding to the minimum propagation delay). After the signal acquisition, the initiating station receives frame counter tracks the received signal timing. The control of the RF receive chain should be adjusted to allow for only enough guard time before the actual signal reception to preserve power and to prevent the receiver exposure to unwanted channel noise before the actual signal reception.

The initiating station starts to receive the responding station signal when the signal arrives as indicated by reference numeral 27. The RF receive chain shall be stabilized at this point to allow signal to pass through undistorted. A unique word-triggering event 28 happens during the acquisition or re-acquisition of the initiating station signal. When the initiating station detects the arrival of the unique word in the received signal, it sets the initiating station receive frame counter to the value corresponds to the unique word location in a frame. This allows the receive frame counter in the initiating station to synchronize to the frame timing of the received signal. At the end of signal reception 29, the demodulator is turned off when it finishes processing the last received bit. The baseband demodulator might need some extra time to finish processing the last received bit after it arrives at the baseband demodulator.

Depending on the propagation delay, the end of signal reception 29 might not coincide with the end of frame 30. In the case of minimum propagation delay, a residual propagation time exists between the end of signal reception and the end of frame. In the case of maximum propagation delay, the end of signal reception coincides with the end of frame. The end of frame also coincides with the start of the next frame.

Before the responding station acquired the signal from initiating station, it is in a receive-only mode. In the receive-only mode, the responding station's transmitter is turned off and the receiver is on all the time trying to acquire a signal. After the signal from the initiating station is acquired and frame timing is established, the responding station then follows the TDD frame timing structure. The events that happen in the responding station during a frame are also illustrated in FIG. 3.

For the responding station, the frame start timing coincides with the leading edge of the first (0th) frame counter clock pulse 31. The frequency channel switching is not performed during the first frame. It is, however, necessary to switch the frequency channel to avoid interference. The channel switching also occurs at the start of the second frame. The channel switching is performed by reprogramming the synthesizer to a different frequency. This is done by reloading the synthesizer with a new channel value and then enabling the synthesizer to switch frequency by a control pulse signal. Since it takes some time to program the synthesizer and for the VCO to settle on the new frequency, it is necessary to make the synthesizer settling time as short as possible through careful design of the RF circuit.

The receive chain of the RF needs to be turned on before the signal actually arrives. In the meantime, the TR switch needs to be configured for reception is denoted by reference numeral 32. The RF Receive Chain Enable needs to allow sufficient time ahead of the actual signal reception such that the active elements in the RF receive chain can ramp up to their steady state. The RF Receive Chain Enable event can overlap transience of the event at the end of the preceding frame to reduce the requirement for the guard time. The overlap time of the two events depends on the specific design of the RF. At this point the responding station starts to receive a signal 33 when the initiating station signal arrives. The RF receive chain shall be stabilized at this point to allow signal to pass through undistorted. During the signal reception a unique word-triggering event happens during the acquisition or re-acquisition of the responding station signal. When the responding station detects the arrival of the unique word 34 in the received signal, it sets the responding station receive frame counter to the value corresponding to the unique word location in a frame. This allows the receive frame counter in the responding station to synchronize to frame timing of the received initiating station signal. At the end of signal reception 35, the baseband demodulator is turned off when it finishes processing the last received bit. The demodulator might need some extra time to finish processing the last received bit after it arrives at the demodulator. The RF receive chain is turned off when the last received bit from the initiating station passes through the RF.

Before the responding station begins to transmit a signal, the active elements in the RF transmit chain need to be turned on and TR switch needs to be configured for signal transmission 36. The control of the RF Transmit Chain must to allow sufficient time ahead of the actual signal transmission such that the active elements in the RF transmit chain can ramp up to their steady state. In some instances, the RF Transmit Chain Enable event can cause the VCO frequency to deviate by a couple of hundred kilo-Hertz due to the pulling of VCO by the power amplifier. In this case, the RF Transmit Chain Enable signal needs to start sufficiently early to allow the synthesizer to settle. The transient time of the TR switch is usually much faster than the transient time of the RF transmit chain. When this occurs, the responding station can start to transmit a signal 37 once all the active elements in RF transmit chain stabilize. The guard time between the end of signal reception and the start of signal transmission in the responding station needs to allow sufficient guard time such that the transient response of the active elements in the initiating station can also stabilize. Since the initiating station has no control of this guard time, this needs to be taken into considerations when programming the responding station timing. When the responding station finishes transmitting the signal 38, it turns off the transmitter. The end of signal transmission can be before or coincide with the end of frame 39. The end of the frame coincides with the start of next frame.

It should be noted that all the TDD frame-timing events follow the structure described above. However, the specific timing for each events differs in different TDD frame and Packet formats to be discussed later. The TDD frame structure described in the above has a transmit and a receive time slot in each frame. This allows for one to one communication. More sophisticated TDD frame structure containing three or more time slots can be used to accommodate more than two stations engaging in communication with each other simultaneously.

One advantage of the TDD frame structure is the power management capability can be realized by gating different sections of the spread spectrum transceiver on only when they are utilized. These allows the mobile apparatus and reference station to be battery- or solar-powered, eliminating the needs to wire the entire region and facilitating quick and low cost deployment of the system. Another advantage of the signal design of the present invention is the time-division aspect of the spread-spectrum signal. If the system does not take advantage of the time-division aspect of the design and transmits and receives continuously, the receive and transmit frequencies would have to be widely separated in order to prevent interference from the transmitter into the receiver. In addition the spread-spectrum receiver of the reference transceiver would require an additional isolation filter (duplexer) to attenuate the transmit signal power. The radio frequency bandwidth required for the TDD signal is only the spread-spectrum bandwidth, Bss, of the direct-sequence spread-spectrum signal. This bandwidth is generally defined by those familiar with the art as approximately twice the PN code chip rate or Bss=~2Rc. This small spread-spectrum bandwidth requirement of the system is a key advantage over other systems, and allows operation in frequency bands that are currently allocated for commercial unlicensed spread-spectrum operation. If the available RF bandwidth is BRF, the number of available frequency channels is L=INTEGER (BRF/Bss). This provides the latitude for the system design to avoid interference. Although the use of only one RF channel for transmission of the time-division spread-spectrum signals by the all reference transceivers is an acceptable implementation of the system, use of more than one distinct transmission channels of bandwidth Bss is preferred if the RF bandwidth is available. Use of more than one distinct RF channel for reference transceiver transmission can reduce the mutual interference among the different stations or mobile apparatus.

Depending on the specific purpose of the communication, the duration of the TDD frame and data packet format transmitted can be varied. Several examples of these packet formats are provided in FIGS. 4, 5, 6. The S-Frame (Synchronization Frame) 46, 52 supports the receivers to quickly acquire or re-acquire the signal. The S-Frame also allows the receiver to sequentially process the acquisition of a signal, thereby minimizing the hardware complexity. The R-Frame (Ranging Frame) 65, 71 supports range measurement. The I-Frame (Information Frame) 81, 86 supports exchange of high rate data or voice between the system elements with minimum delay. The S-Frame is always used to establish a communication link. After the communication link is established, either R-Frame or I-Frame formats can be employed depending on the purpose of the communication session.

Within each frame format, data to be transmitted is organized in a certain manner. In the preferred embodiment, there are three kinds of data packets; one is S-Packet 58, one is R-Packet 74, and one is I-Packet 89 corresponding to the S-Frame, I-Frame, and R-Frame, respectively.

As an example, if the PN chip rate is at 960 kHz and the PN code used in the S-Frame has a period of 63 chips, the symbol rate associated with the S-frame is 960/63 kHz (15.238 kHz). There are 2832–4096 symbols within an S-Frame. The duration of a S-Frame is 185.9 to 268.8 mini-second.

The S-frame for the initiating station is illustrated in FIG. 4. There was a 16 symbol duration guard time 40 in the beginning of the frame, 1400–2032 symbol duration signal transmission time 41 depending on the data volume, another 12 symbol duration guard time 42 between the transmit and receive switching, a propagation delay up to 4 symbol duration 43, variable 1400–2032 symbol duration signal reception time 44, and residual propagation delay time 45.

The S-frame for the responding station is illustrated in FIG. 4. There is a 16 symbol duration guard time 47 in the beginning of the frame, variable 1400–2032 symbol duration signal reception time 48, another 12 symbol duration guard time 49 between the receive and transmit switching, and a variable 1400–2032 symbol duration signal transmit time 50 and a 4 symbol guard time 51.

The data transmitted in the S-Frame is organized as an S-Packet. The format of an S-Packet is shown in FIG. 4. The S-Packet consists of a 1280 symbol synchronization preamble field 53, an 8 symbol unique word field 54, a 16 symbol identification code field 55, a 24 symbol signaling field 56, and a 72–704 symbol data field 57. The ID field of the S-packet carries the ID of the transmit station. The signaling field carries the specific instructions for the receiving station and the ID of the receiving station.

One advantage of the present signal design is to reduce the complexity of the spread spectrum transceiver. Most of the spread spectrum transceivers for tracking the TDD signal uses matched filter (i.e., a parallel correlator) implementation which allows the receiver to quickly synchronized to the signal. The implementation of the matched filter type spread spectrum transceiver requires a substantial amount of hardware. The long preamble design of the present invention allows the receiver to process the signal synchronization sequentially using a serial correlator implementation, thereby significantly reduces the hardware complexity and greatly enhance the flexibility of the system. The preamble has a 1280 symbol duration 53. It allows the receiver to search through the code uncertainty, acquire and track the code epoch, acquire, and track the carrier frequency and phase before the arrival of the unique word. The correlation time of the receiver is typically set at one symbol duration. The receiver can search half a chip uncertainty at each correlation time. Therefore, the receiver can search through 63 code uncertainty epochs sequentially in 126 symbol time. For the correlation time used, the frequency difference between the received signal and the receiver carrier should be less than +/−3.8095 kHz (symbol rate divided by 4) to ensure that the signal can be acquired. This typically required the use of high stability TCXO (Temperature Compensated Crystal Oscillator), from which the carrier frequency is generated with a synthesizer, in the spread spectrum transceivers. One novel approach to avoid the use of high stability TCXO is to change the receiver carrier frequency in interval of 7.619 kHz (2×3.805 kHz) each time after the whole code period has been searched through. By adjusting the receiver carrier frequency, the receiver searched through a different frequency region. The long preamble allows the receiver to search through at least six frequency regions, each 7.619 kHz wide, for a total range of +/−22.857 kHz range. This relaxes the requirements on the oscillator stability by a factor of 6. As an example, if the carrier frequency is 928 MHz, the frequency uncertainty of +/−15.238 kHz corresponds to an oscillator instability of 24.63 ppm (part per million). The required oscillator stability in the spread spectrum transceivers is 12.315 ppm, which can be implemented with a low cost temperature compensated crystal. Thus, the signal design of the present invention also has the advantage of using low cost oscillator.

Once the PN code acquisition and tracking and the carrier frequency and phase tracking have been accomplished, the receiver can start to demodulate data. Since the bit duration in the above format is the same as to the PN code period and the start of each bit corresponds to start of a code period, the bit timing can be automatically established once the PN code has been tracked. The receiver looks for the occurrence of the unique word pattern to establish the frame timing. The receiver also retrieves the ID code, signaling information, and data.

FIG. 5 is an example embodiment of the R-Frame. The duration of a R-Frame is 1.088 second. The symbol rate associated with the R-frame is 960/255 ksps (3.764 ksps). There are 4096 symbols within an R-Frame.

For the initiating station, there is a 16 symbol duration guard time 59 in the beginning of the frame, 2032 symbol duration signal transmission time 60, a 12 symbol duration guard time between the transmit to receive switching 61, a propagation delay of up to a 4 symbol duration 62, a 2032 symbol duration signal reception time 63, and residual propagation delay time 64.

For the responding station, there is a 16 symbol duration guard time in the beginning of the frame 66, a 2032 symbol duration signal transmission time 67, another 12 symbol duration guard time between the transmit to receive switching 68, a 2032 symbol duration signal reception time 69, and a 4 symbol guard time 70 at the end of a frame.

The R-Packet format 74 is shown in FIG. 5. The first 1968 symbols 72 have no data and are used strictly for ranging purpose. The remaining 64 symbols 73 are used for signaling. The data rate of the R-Frame is lower than that of the S-frame, thus a longer correlation time is allowed. The longer correlation time reduces the effects of the channel noise significantly. In the meantime, longer packet duration also permits the tracking error to be reduced during the preamble and allows the narrower receiver bandwidth to used. Thus, the design of the R-Frame has the advantage of minimizing overall PN code tracking error which results in more accurate range measurements as will become evident later.

FIG. 6 illustrates an example embodiment of the I-Frame 81, 86. The symbol rate associated with the I-frame is 80 ksps. The duration of an I-Frame is 6.375 mini-second. There are 510 symbols within an I-Frame. For the I-Frame of the initiating station, there is a 25 symbol duration guard time 75 in the beginning of the frame, a 220 symbol duration signal transmission time 76, another 25 symbol duration guard time between the transmit to receive switching 77, a propagation delay of up to 20 symbol duration 78, 220 symbol duration signal reception time 79, and residual propagation delay time 80. For the I-frame of the responding station, there is a 45 symbol duration guard time 82 in the beginning of the frame, a 220 symbol duration signal transmission time 83, another 25 symbol duration guard time 84 between the transmit to receive switching, and a 220 symbol duration signal reception time 85. The I-Packet 89 consists of a 204 symbol data or voice field 87 and a 16 symbol signaling field 88.

Although various packets are used, they all follow the similar TDD frame structure. The advantage of the above packet formats is that various requirements for synchronization, ranging, voice communication can be simultaneously achieved with a single spread spectrum transceiver.

An example of the direct-sequence spread-spectrum modulation technique used is PN code modulated phase shift keying or PN/BPSK. The binary PN code from the transmit PN generator, which is generated at a chip rate Rc=2 KRd chips/sec is then Modulo-2 added to the data streams. The resulting data streams binary phase shift key (BPSK) modulate frequency carrier by imposing a phase shift of 0 or 180 degrees at the symbol transition depending on the polarity of the symbol stream. Since the code chip rate is normally several orders greater than the data rate, the bandwidth of the PN/BPSK signal is characterized by the PN code chipping rate, not the data rate. Thus the signal is spread by the PN code modulation, with the data bandwidth several orders of magnitude smaller. In the present system, the PN code and the symbol data stream are synchronous so that data bit transitions are coincident with the PN code clock and with the PN code bit transitions. Another example of the direct sequence spread-spectrum modulation technique is PN code modulated quadrature phase shift keying or PN/QPSK. The data stream is de-multiplexed into two data streams and the binary PN code binary PN code is then Modulo-2 added to both data streams. The two binary streams modulate frequency carrier by imposing a phase shift of 0, 90, 180, or 270 degree at the symbol transition edge depending on the polarity of both data streams.

Figure 7:
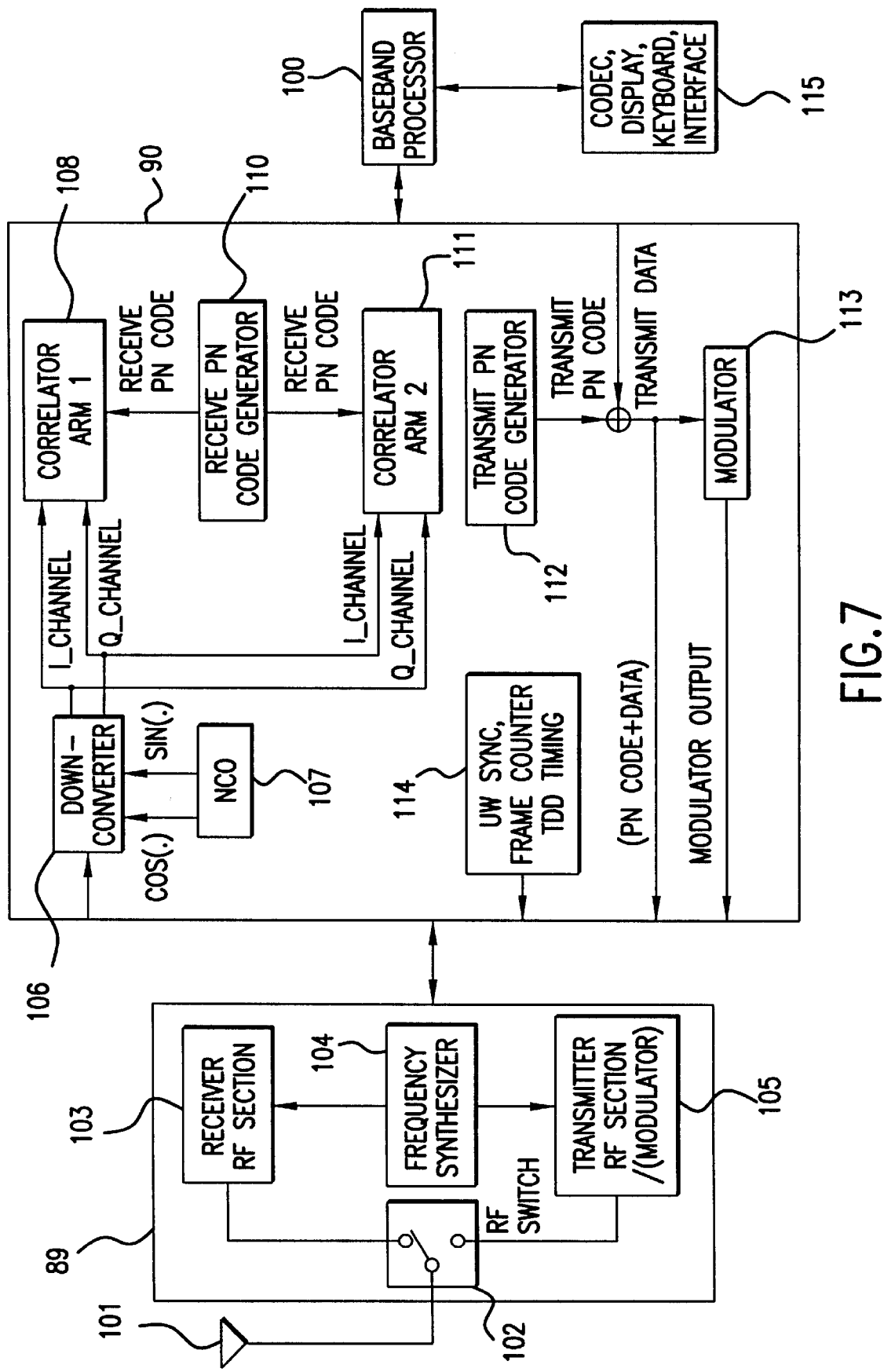
FIG. 7 is the block diagram of a representative implementation of the spread spectrum transceiver.

A preferred embodiment of the spread spectrum transceiver is depicted in FIG. 7. It consists of a RF (Radio Frequency) section 89, a correlator section 90, a baseband processor 100, and an antenna 101. The RF section consists of an RF switch 102 which routes the transmit signal from the transmitter 105 to the antenna 101 and the received signal from antenna 101 to the receive RF section 103. The transmitter RF section 105 translates the signal from a lower frequency to the desired carrier frequency and amplifies the signal to the desired output power. Alternatively, the baseband PN code and symbol stream can directly modulate the carrier frequency to generate the desired spread spectrum signal in the transmitter RF section 105. The received signal is filtered, amplified, and downconverted to lower frequency in the receiver RF section 103. The power supply to the transmitter RF section 105 and receiver RF section 103 can be independently controlled to reduce the power consumption. The frequency synthesizer 104 generates a RF signal at the desired frequency for upconverting the transmit signal to the carrier frequency or downconverting the signal at the carrier frequency to a lower frequency. The frequency synthesizer 104 can be reprogrammed to different frequencies so that the spread spectrum transceiver can operate at different carrier frequencies.

The correlator section 90 is typically realized with digital implementation using VLSI technology. The received signal is downconverted to baseband using a downconverter 106. The local oscillator signal for the downconverter is generated using a NCO (Numerical-Controlled Oscillator) 107. The I and Q channel baseband signals are correlated with the receive PN code generated by the receive PN code generator 110. The receive PN code generator 110 driven by an NCO (Numerical-Controlled Oscillator) can be programmed to generate different PN codes. The frequency of the PN code generator is adjusted by the NCO. The two correlators 108, 111 are typically required for use to track the PN code epoch and to detect the data in the signal. The correlator correlation time typically coincides with the PN code period and the symbol duration and is programmable under the control of the baseband processor. The transmit PN code generator 112 generates the transmit PN code. The transmit PN code is exclusive-or with the transmit data and used to modulates the signal in the modulator 113. Alternatively, the PN code and symbol stream can directly modulate the carrier signal at the RF transmitter section. The TDD frame timing and power gating control is generated in the UW sync, Frame Counter, TDD Timing block 114.

The timing unit within a frame is of a symbol duration. The symbol timing is obtained by dividing down from the PN code clock using a resettable counter. The reset value of the counter is programmable so that the symbol clock can be varied. If the spread spectrum transceiver is configured as an initiating station, two frame counters, one for transmitting and one for receiver will be used. If the spread spectrum transceiver is configured as the responding station, only the receive frame counter is used. The transmit frame counter is clocked by the transmit symbol clock and the receive frame counter is clocked by the receive clock. The receiver frame counter setting can be established initially by the UW sync (unique word synchronizer) which looks for the occurrence of a unique word in the received signal. Once the unique word is found, the receive frame counter is reset to a pre-stored value. It should be noted that unique word sync can also be implemented in the baseband processor. The frame counter is compared against a set of values stored in registers which are programmable under the control of the baseband processor. When the frame counter value matches one of the value stored in register, it generates a TDD timing signals for controlling one of the frame events shown in FIG. 3. This set of values is programmable so that different sets of TDD frame timing can be realized. The frame counter is reset to its initial value at the end of a frame. When the frame counter is reset to its initial value, it generates a TDD timing signal which is used to enable synthesizer programming if a different channel is used in the next frame and/or to load a different PN code seed if a different PN code is used in the next frame. A set of registers is used to record the state of the receiver PN code generator and the associate NCO. The values stored in these registers are used to compute the range and position. The state of the receiver PN code generator and associate NCO is latched onto the registers at the start of the transmit PN code period.

The baseband processor 100 is implemented with general purpose microprocessor or DSP (Digital Signal Processing) chip. The baseband processor is equipped with a CPU, RAM, and ROM. The baseband processor is responsible for configuration of the correlator section, performing receiver acquisition and tracking, and performing ranging and positioning computation. The baseband processor is also responsible for buffering and formatting the transmit data and for buffering and unpacking the received data. It is typically also responsible for the control of the display and keyboard interface and the control of interface to codec 115.

The transceiver has the capability to be configured for different TDD frame timings, packet formats, PN codes, and frequency channel via a combination of software and correlator design. The timing for the TDD frame events is generated by comparing the frame counter 114, driven by data (symbol) clock, against a set of values stored in the registers. If this set of values is modified at the start of a new frame, a new TDD frame timing can be generated. The packet format is assembled and unpacked in the baseband processor 100, it can be easily re-configured in the software. The PN code generator 111 and 113 in the correlator is typically implemented with shift register with feedback taps. By reloading the shift register with different values and reconfigure the feedback taps at the start of a new TDD timing frame, the PN code can be changed. The signal to reload the PN code generator shift register and feedback taps is triggered by the start of the frame signal. Change of frequency is accomplished by reprogramming the frequency synthesizer 104 at the beginning of the TDD frame. The ability to switch between different TDD frames allows the present invention to realize many novel features such as ranging, data message transfer, and voice communications with a simple transceiver structure. The present embodiment also allows substantial miniaturization of the transceiver using the present VLSI technology.

In the preferred embodiment, all reference stations, mobile apparatus, and the central station are normally in a receive-only mode. A common carrier frequency and PN code is used in the S-Frame for all the reference stations, the central station, and the mobile apparatuses. This enables the signal to be received by all transceivers in the central station, the reference stations, and mobile apparatuses. The initialization of the link starts with a mobile apparatus, reference station, or central station sending out an S-Packet using an S-Frame timing structure.

Figure 8:
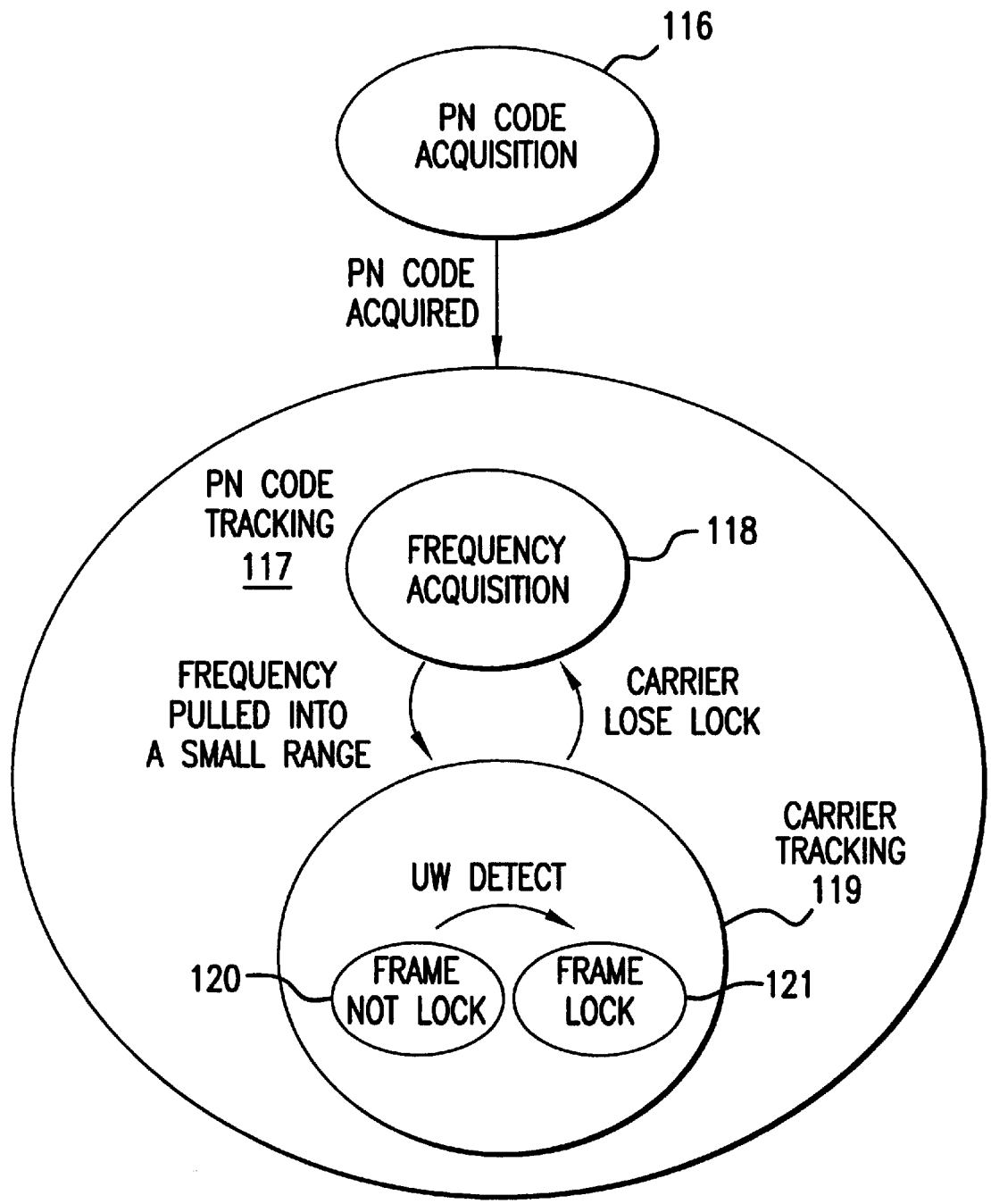
FIG. 8 is the flow chart of receiver acquisition sequence.

Signal acquisition is required before any sort of communication or ranging operation can be accomplished. The signal acquisition sequence of the receiving station is depicted in FIG. 8 as explained hereinbelow.

The spread spectrum transceiver is normally set to a continuously receiving mode. The receiver PN code epoch and the PN code epoch of the incoming signal are not aligned initially. The receiver PN code is free running at a nominal chipping rate. If the offset in the transceiver clock rates and that of the incoming signal are small, the PN epoch offset between the receiver and the incoming signal stays fixed for a certain duration. The receiver wishes to align its PN epoch with that of the incoming signal by hypothesizing a PN code epoch and checking the cross-correlation between the incoming signal and the receiver PN code. The receiver searches through the PN code period of the incoming signal by adjusting (advancing or retarding) its locally generated PN code epoch in fixed increments. This has the effects of changing the PN code epoch offset in fixed increments. In the preferred embodiment, the search increment or search step size is ½ of the PN code chip time. The receiver computes the correlation value between the locally generated code and the received signal after each increment of the PN code clock and compares the value to the search threshold level. If the threshold is exceeded, the receiving station hypothesizes that the PN code epoch of the received signal has been acquired and enters a PN code-tracking phase. If the threshold is not exceeded, the search continues until all possible phases of the PN code epoch have been tested. The PN code acquisition can be achieved when the carrier frequency offset of the receiver and the incoming signal is less than a quarter of the inverse of correlation time. It typically requires a high stability TCXO (Temperature-compensated crystal oscillator) to achieve this kind of accuracy. To alleviate the high stability requirements, the receiver divides the uncertainty frequency range into regions of width equal to a half of the inverse of the correlation time. Starting with one particular frequency setting, if all possible phases of PN code phases have been tested, the receiver sets its frequency to the middle of the second frequency region and performs the testing for all possible phases. Depending on the length of the preamble in the signal, the receiver can search through a few frequency regions for a possible PN code epoch during the preamble duration. This relaxes the requirements on the oscillator accuracy. If the search fails to produce a correlation value which exceeds the acquisition threshold, the receiver starts from the first frequency region and re-searches again.

PN Code Tracking maintains the alignment of the receiver PN code and that of the incoming signal. This allows the receiver to despread the signal and recover the data in the incoming signal. The accuracy of the alignment affects the received BER (bit error rate) as well as the precision in the range measurement. PN Code Tracking is performed using a delay-locked loop tracking principle. The receiver is capable of providing three PN code epochs: On-Time PN code, delay-by-half-a-chip PN code, and advance-by-halfa-chip PN code. The receiver compares the correlations obtained by using the delay-by-half-a-chip PN code and advance-by-half-a-chip PN code. If the correlation obtained by the delay-by-half-a-chip PN code is greater than that by advance-by-half-a-chip, the delay-by-half-a-chip PN code epoch is in closer alignment to the received PN code epoch. The receiver then slows down its PN code clock to move its PN code epoch closer to that of the received signal. On the other hand, if the correlation obtained by advance-by-half-a-chip PN code is greater, the receiver speeds up its PN code clock. By constantly performing this operation, the receiver can align its PN code epoch to that of the incoming signal with great accuracy.

While the PN code tracking 117 is in progress, the receiving station starts to adjust its carrier frequency 118 and phase 119 to bring them in close agreement with the received signal. In the preferred embodiment, both of these functions are implemented in a digital approach on samples of the received signal. The carrier frequency acquisition is implemented with a balanced discriminator. The balanced discriminator provides an estimate of the frequency offset between the received signal and the local numerical controlled oscillator (NCO). Frequency acquisition employs closed-loop-tracking principle using the output of the balanced discriminator to adjust the NCO frequency close to that of the received signal.

The carrier tracking is accomplished using a Costas loop tracking operation. The error signal of the Costas loop is obtained first, filtered, and then used to adjust the frequency of the NCO. Initially, a wider loop bandwidth is used to ensure that the Costas loops can pull-in the signal phase. Once the loop has pulled in, the loop bandwidth is narrowed incrementally to achieve better tracking accuracy.

The carrier frequency is derived from the same oscillator as the PN code clock. The two frequencies are coherently related. Once carrier tracking has been achieved, the carrier frequency offset relative to the nominal carrier frequency can be used to compute the PN code clock offset. The error in the PN code clock computed from the carrier frequency offset is significantly lower than the offset of the PN code frequency obtained from the PN code tracking. Thus, the carrier-tracking loop can be used to aid the PN code tracking to enhance the accuracy of the PN code tracking. This technique is called carrier rate aiding.

The symbol clock of the received signal is coherently related to the clock of its PN code. Therefore the symbol clock can be obtained by dividing the PN clock. The leading edge of the symbol clock always coincides with the leading edge of the first PN clock within a code period. If the symbol duration is the same as the PN code period, the symbol clock is available as soon as PN code is tracked.

The receiver intends to capture the signal of the initializing station does not yet have the knowledge of the TDD slot timing of the incoming signal it is attempting to acquire 120. The normal time gating based on the TDD Frame structure is not performed until the receiver has established the TDD timing from the received signal. The acquisition of the frame timing is accomplished by detecting a unique word pattern in the received signal and resetting the frame counter to its proper value. Once the unique word is detected and the frame timing established, normal TDD time gating is then performed.

When PN code, carrier phase, symbol tracking, and frame timing have been established 121, the receiving station can then retrieve the signaling information and data in the received signal. A data message is provided in the signaling field instructing whether the receiving station to respond by sending an acknowledgment signal or not in the second half of the TDD frame. The receiver is also capable of demodulating the other data message which is embedded in the spread-spectrum signal.

For the purpose of determining its position within the course and making range measurements to a selected feature, the mobile apparatus is capable of making measurements of the time difference (pseudo-range) of the PN code epoch of the incoming signal and the local PN code epoch for the purpose of computing the range to the selected reference stations. In the preferred embodiment of the present invention, the mobile receiver makes these measurements in a serial fashion, selecting first one of the three reference stations and making a measurement and then repeating with each of the remaining reference stations. In an alternative embodiment of the present invention, the mobile apparatus can be equipped with several receivers. The mobile apparatus is then capable of simultaneous tracking and performing measurements of several reference stations at a time.

Dependant upon the particular feature to range to, the mobile apparatus scans a table in its memory (the content of which was transmitted to it and stored into its memory during initialization of the database in the mobile apparatus) to find ID's of a set of reference stations it needs to perform ranging with a selected feature. In general, three reference stations are required to perform a three-dimensional position fix. However, if the terrain around a particular feature is flat and the height coordinate of the terrain is downloaded into mobile station as part of the course information, only two reference stations are needed for two-dimensional position fix.

The mobile apparatus initiates the pseudo-range measurements by sending an S-Packet to poll one of the selected reference station. The mobile apparatus indicates in the signaling field the ID of the desired reference stations it is polling (activating). When the reference station acquires the signal from the initiating mobile apparatus and recovers the data in the signal, if the ID matches that of the particular reference station, it sends an acknowledging S-Packet back to the mobile apparatus. The mobile apparatus acquires the acknowledging S-Packet signal from the polled reference station in the second half of the S-Frame. After the mobile apparatus acquires the signal from the polled reference station, the mobile apparatus and the reference station both switch to the R-Frame format, a new carrier frequency, and a new PN code. This avoids interference to the other mobile apparatus and reference stations, which use the common carrier frequency, and PN code to initializes the link.

Once the mobile apparatus and reference station switch to the R-Frame, the mobile apparatus and reference station track the PN code epoch of the incoming signals with a very narrow loop bandwidth to reduce the tracking error. To determine the free space distance between the mobile apparatus and the reference station, the mobile apparatus and the reference station both perform pseudo-range measurements during their respective receiving half of the R-Frame. Since the duration of the receive time slot in an R-Frame is approximately half a second, the PN tracking loop bandwidth of the mobile apparatus and reference station is set to be 2 Hz in the preferred embodiment. This loop bandwidth allows the tracking error to be reduced during the time span from the beginning of the receive packet to the pseudo-range measurement instant. The round trip delay of the signal between the mobile station and the reference station can be computed using both the measurements in the mobile apparatus and the reference station.

Figure 9:
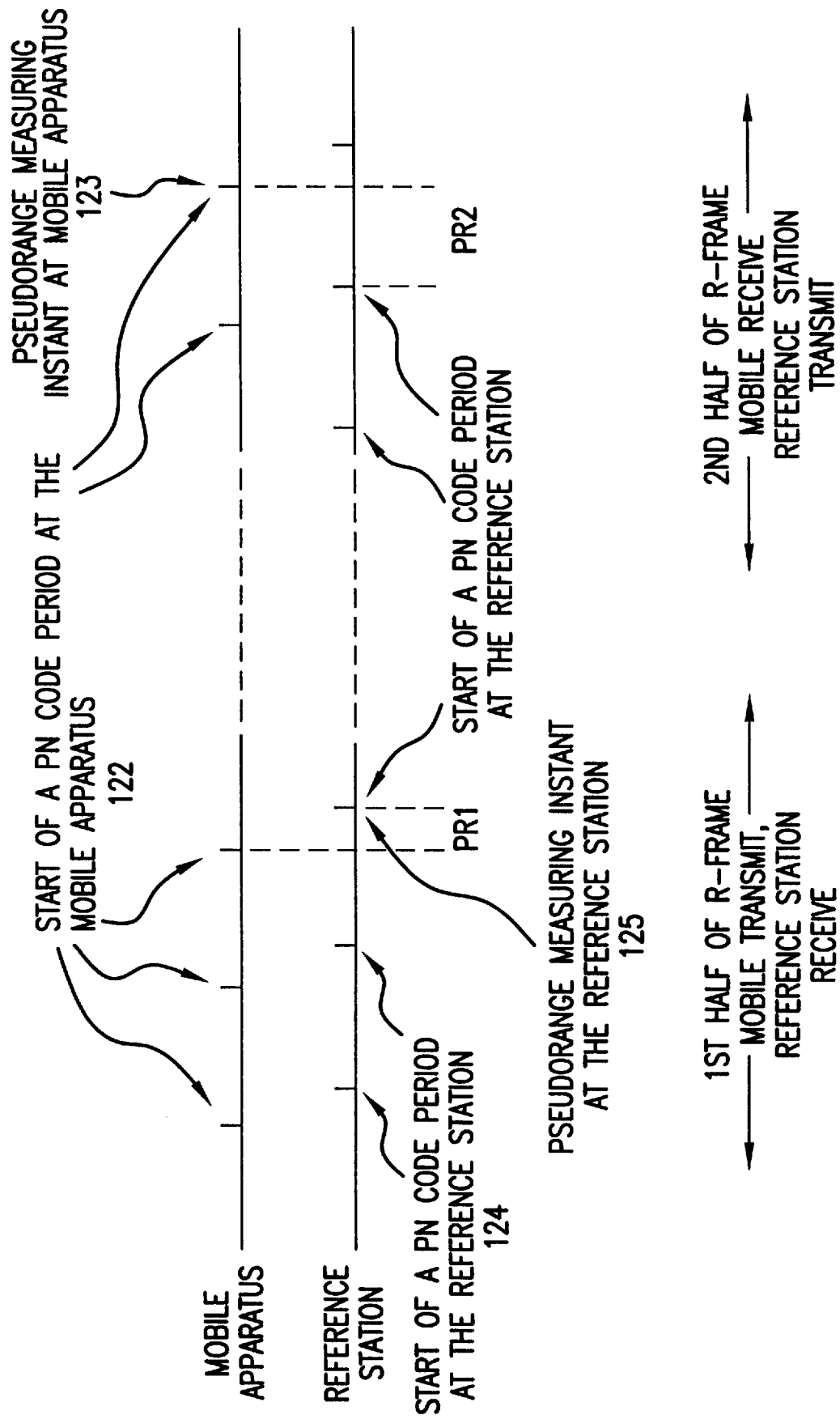
FIG. 9 illustrates the relationship of pseudo-range measurements in the mobile apparatus and the reference station.

When the receiver tracks the PN code of the incoming signal, the receiver PN code generator is in time alignment with the PN code of the incoming signal, i.e., the delayed version of the PN code epoch in the transmitter of the incoming signal. The time difference between the PN code epoch of the transmitter and the PN code epoch of the incoming signal is equal to the state of the receiver PN code if the measurement is made at the start of a transmit PN code period 122, 124 (i.e., when the state of transmit PN code is zero) as shown in FIG. 9. Depending on the implementation of the PN code generator, the timing state of the receiver PN code generator consists of the number of chip elapsed from the beginning of a code period and the fractional clock phase of a PN code chip which is typically represented by the phase of the NCO. The state of the receiver PN code is as follows:

State of receiver PN code generator=fractional PN code phase from the state of PN NCO+number of PN code chip within a code period For illustration purpose, assume that the PN code-chipping rate is 960 kHz and the period of the PN code generator is 255 chip time. If the maximum uncertainty between any two the position coordinate within the region is less than 39843.75 meters or 127.5 chip time, we can normalize the PN code state to the [−39843.75, 39843.75] meter range in the numerical computation, or, equivalently we can normalize the receiver PN code state to [−127.5, 127.5] chip time.

FIG. 9 explains the relationship between the pseudo-range measurement made by a reference station and the mobile station and the clock drift. First assuming that there is no clock drift and propagation delay, the pseudo-range measurement at the reference station 125 is equal to the code period minus the pseudo-range measurement at the mobile apparatus 123, i.e., PR1=255−PR2. If PR1+PR2 is normalized to [−127.5, 126.5], it is equal to zero.

There are two contributions to the error in range measurements, one is due to the clock difference between the mobile apparatus and the reference station and the other due to the hardware delay. We first look at the case when there is a clock frequency difference between the transmit PN code of the mobile apparatus and the reference station while ignoring the propagation delay. If the transmit mobile clock is faster than that of the reference station, measured PR1 is less than 255−PR2, i.e., PR1+PR2, when normalized to [−127.5, 127.5], is negative. If the mobile clock is slower than the reference station and PR1 is greater than 255−PR2, i.e., PR1+PR2, when normalized to [−127.5, 127.5], becomes positive.

$$PR1=255-PR2-\Delta t$$

or $$PR1+PR2=-\Delta t \text{ (normalized to } [-127.5, 127.5])$$

where Δt is the amount of clock error from the pseudo-range measurement instant in the first time slot to the pseudo-range measurement in the second time slot in a TDD frame. The clock error Δt is equal to the transmit PN code clock frequency difference between the mobile apparatus and the reference station times the elapsed time between the pseudo-range measurement made in the mobile apparatus and the pseudo-range measurement made in the reference station. When we consider the propagation delay, the above equation becomes PR1+PR2=−Δt+propagation delay from mobile apparatus to reference station+propagation delay from reference station to mobile apparatus The delay experienced by the signal from the mobile apparatus to the reference station can be broken down into the following Propagation Delay=Mobile Transmitter Hardware Delay+ Free Space Delay+Reference Station Receiver Hardware Delay Since we are only interested with free space delay, the Δt and hardware delay should be removed from the above equation. The clock error, Δt, is due to the clock frequency offset between transmit PN code of the mobile apparatus and that of the reference station. The transmit PN code clock frequency offset is proportional to the carrier frequency offset between the mobile apparatus and the reference station because they are derived from the same oscillator and are coherently related by a fixed ratio. When the carrier frequency is tracked, the frequency of the NCO 107 in the downconverter represents the carrier frequency offset between the mobile apparatus and the reference station. Using this information, the clock frequency offset between the transmit PN code of the mobile apparatus and that of the reference station can be precisely computed. The clock error, Δt, is obtained by multiplying the clock frequency offset by the time elapsed between the pseudo-range measurements made in reference station and the mobile apparatus. There are several techniques to measure the hardware delay. The hardware delay in the transmitter and receiver is temperature dependent. It can be pre-calibrated in the laboratory by measuring the delay variation as a function of the temperature and stored in the transceiver memory. The transceiver can be equipped with a temperature sensor to determine the temperature of the oscillator. When the temperature is known, the hardware delay can be retrieved from the data stored in memory. Alternatively, the hardware delay can be calibrated by looping the transmit spread spectrum signal to the receiver within the same spread spectrum transceiver. The transmitter and receiver in the spread spectrum transceiver are simultaneously activated. The signal of the transmitter leaks through the TR switch at the RF section to the receiver. The leak-through signal can be amplified and processed the same way as the incoming signal from other transceiver. The receiver performs the same PN code acquisition and tracking on the looped back signal and make the same pseudo-range measurement as if the signal is from other transceiver. The measured pseudo-range is the time-difference of the transmit PN code epoch and the receive PN code epoch and is equal to the sum of the local transmitter hardware delay and the local receiver hardware delay. This type hardware calibration procedure can be used to obtain the hardware delay in the mobile apparatus and the reference station. If the self-calibration is performed immediately before or after the pseudo-range measurements in the mobile apparatus and reference station, very high accuracy in the hardware delay measurements can be achieved.

After the pseudo-range measurements have been performed, the reference station transmits to the mobile apparatus its pseudo-range measurement, hardware delay, position coordinate, and the position coordinate of the particular feature to range to. The mobile apparatus computes the range to the reference station by 1. computing PR1+PR2 2. subtracting the clock error and the hardware delays, 3. normalizing to [−127.5, 127.5]. After the mobile station computes the range to the first reference station, it repeats the same procedure to the second and third reference stations to obtain the range to them. Typically, several sets of range measurements to the selected reference stations are performed to reduce the effects of channel noise.

A unique feature of the present invention is that all reference stations only required to be synchronized to the signal from the mobile apparatus when they are interrogated. The pseudo-range measurements are performed independently in the mobile apparatus and the reference station. This significantly reduces complexity of the system design. Since the reference stations are not required to in timing synchronization of each other, this eases the deployment of the reference stations and eliminates the needs to use radio frequency resource to disseminate timing signal to synchronize all the reference station timing.

With knowledge of the location coordinates of the selected reference stations, the three distance measurements between the reference station and the mobile apparatus are used to solve for the location of the mobile apparatus within the golf course using hyperbolic multi-lateration principle. The location of the mobile apparatus is then used to compute the distance to various features whose location coordinates are transmitted to the mobile apparatus from the database stored in the reference stations.

A least square algorithm based on the hyperbolic multi-lateration principle is described here. To formulate the least square algorithm, we start with the linearization of the range equation. The basic formula for the pseudo-range measurement between the mobile apparatus and the reference station is $$\rho^j(t) = \sqrt{(X^j(t) - X_m(t))^2 + (Y^j(t) - Y_m(t))^2 + (Z^t(t) - Z_m(t))^2} + \alpha^j + \Delta t * c + n^j$$

where $(X_m(t), Y(t)_m, Z(t)_m)$ is the unknown mobile position coordinate, $(X^j(t), Y^j(t), Z^j(t))$ is the $j^{th}$ reference station position coordinate, $\alpha^j$ is the hardware delay in meter, $\Delta t*c$ is the clock offset, and the last item is the noise in the measurement If the approximate values $(X_{m,0}(t), Y(t)_{m,0}, Z_{m,0})$ for the mobile apparatus position coordinates are available, an approximate distance $\rho_0^j$ can be calculated by $$\rho_0^j(t) = \sqrt{(X^j(t) - X_{m,0}(t))^2 + (Y^j(t) - Y_{m,0}(t))^2 + (Z^j(t) - Z_{m,0}(t))^2}$$

The unknown mobile station position can be expressed as $$X_m = X_{m,0} + \Delta X_m$$

$$Y_m = Y_{m,0} + \Delta Y_m$$

$$Z_m = Z_{m,0} + \Delta Z_m$$

where now $\Delta X_m = X_m - X_{m,0}$, $\Delta Y_m = Y_m - Y_{m,0}$ and $\Delta Z_m = Z_m - Z_{m,0}$ are the new unknown. If the approximate value is reasonably close to the actual mobile apparatus position, then the basic range formula can be expanded into a Taylor series with respect to the approximate point. This leads to $$\rho^j(t) \cong \rho_0^j(t) - \frac{X^j(t) - X_{m,0}}{\rho_0^j} \Delta X_m -$$

$$\frac{Y^j(t) - Y_{m,0}}{\rho_0^j} \Delta Y_m - \frac{Z^j(t) - Z_{m,0}}{\rho_0^j} \Delta Z_m + \alpha^j + \Delta t * c + n^j$$

Thus, the pseudo-range is expressed as a linear equation with respect to the unknown $\Delta X_m$, $\Delta Y_m$, $\Delta Z_m$.
Using the linearized formula for range, the preceding equation can be rewritten as $$\rho^j(t) - \rho_0^j(t) - \alpha^j - \Delta t * c \cong$$

$$-\frac{X^j(t) - X_{m,0}}{\rho_0^j(t)} \Delta X_m - \frac{Y^j(t) - Y_{m,0}}{\rho_0^j} \Delta Y_m - \frac{Z^j(t) - Z_{m,0}}{\rho_0^j} \Delta Z_m + n^j(t)$$

If we have distance measurements to n reference stations, we can define the following:

$$l = \begin{bmatrix} l^1 \\ l^2 \\ \vdots \\ l^n \end{bmatrix} = \begin{bmatrix} \rho^1 - \rho_0^1 - \alpha^1 - \Delta t * c \\ \rho^2 - \rho_0^2 - \alpha^2 - \Delta t * c \\ \vdots \\ \rho^n - \rho_0^n - \alpha^n - \Delta t * c \end{bmatrix}$$

The above column matrix is called observed minus predicted matrix. We also define the following:

$$A = \begin{bmatrix} -\frac{X^1(t) - X_{m,0}}{\rho_0^1} & -\frac{Y^1(t) - Y_{m,0}}{\rho_0^1} & -\frac{Z^1(t) - Z_{m,0}}{\rho_0^1} \\ -\frac{X^2(t) - X_{m,0}}{\rho_0^2} & -\frac{Y^2(t) - Y_{m,0}}{\rho_0^2} & -\frac{Z^2(t) - Z_{m,0}}{\rho_0^2} \\ \vdots & \vdots & \vdots \\ -\frac{X^n(t) - X_{m,0}}{\rho_0^n} & -\frac{Y^n(t) - Y_{m,0}}{\rho_0^n} & -\frac{Z^n(t) - Z_{m,0}}{\rho_0^n} \end{bmatrix}$$

The above matrix is called solution matrix. Further define the followings:

$$x = \begin{bmatrix} \Delta X_m \\ \Delta Y_m \\ \Delta Z_m \end{bmatrix}$$

and $$n = \begin{bmatrix} n^1 \\ n^2 \\ \vdots \\ n^n \end{bmatrix}$$

The linearized equations for n pseudo-range measurements can be rewritten as follow:

$$l = Ax + n$$

If we assume that the measurement noise $n^1, n^2, \ldots, n^n$ are uncorrelated, the least square solution for x is $$x = [A^T A]^{-1} A^T l$$

Note $A^T A$ is called the covariance matrix and $(A^T A)^{-1} A^T$ is called the navigation matrix.
The position estimation of the mobile apparatus is given as $$X_m = X_{m,0} + \Delta X_m$$

$$Y_m = Y_{m,0} + \Delta Y_m$$

$$Z_m = Z_{m,0} + \Delta Z_m$$

It should be noted that the above procedure does not restrict the number of reference stations to which the pseudo-range measurements are performed. Position estimation using pseudo-range measurements to more reference stations has higher accuracy at the expenses of increased computation load for the processor in the transceiver. Typically, several pseudo-range measurements are made to the same reference station. The least square algorithm starts with an initial guess of mobile apparatus position. An estimate of mobile position can be obtained with the least square algorithm using one pseudo-range measurement to each selected reference station. The estimated position is then used as the initial guess of mobile apparatus in the second iteration of least square algorithm using the second pseudo-range measurement to each selected reference station. In general, the more pseudo-range measurements are available, the better accuracy can be achieved.

The reference stations are placed at strategically selected locations within the course to minimize the position estimation error of the mobile station. In general, the locations of the reference station only minimize the position estimation error within certain part of the region. In some other location, the position estimation error can be higher due to poor geometry among the position of the reference stations and the position of the mobile apparatus. This position estimation error due to poor geometry can be quantified by a parameter called PDOP (Position Geometric Dilution of Precision). The computation of PDOP is from the navigation matrix $(A^T A)^{-1} A^T = G$
where $$\underline{G} = \begin{bmatrix} G_{1,1} & \cdots & G_{1,n} \\ G_{2,1} & \cdots & G_{2,n} \\ G_{3,1} & \cdots & G_{3,n} \end{bmatrix}$$

and $$PDOP = \sum_{i=1}^{3} \sum_{j=1}^{n} G_{i,j}^2$$

If the PDOP exceeds a threshold value, of for instance 10, it indicates that the estimation of the position of the mobile apparatus is not very accurate. The mobile apparatus can select additional reference stations to range to. Once the range measurement to the additional reference station is obtained, it can be incorporated into the position estimation computation. The new PDOP is computed to determine if the desired precision has been achieved, otherwise, additional reference station will be used.

The advantage of the above invention is that the complexity of the computation is low. Thus, the computation can be performed with a low cost microprocessor or DSP (Digital Signal Processor) chip equipped with a moderate amount of memory. Another advantage of the present invention is that it is numerically stable with respect to the round-off error or pseudo-range measurement errors.

Once the position of the mobile apparatus is obtained, the distance to a particular feature can be easily computed. If the present invention is used in a golf course, not only the range between the golfer and any feature within the course can be obtained, the elevation difference between the golfer and the selected feature can be computed. This information is of considerable advantage to the skilled golfer.

Figure 10:
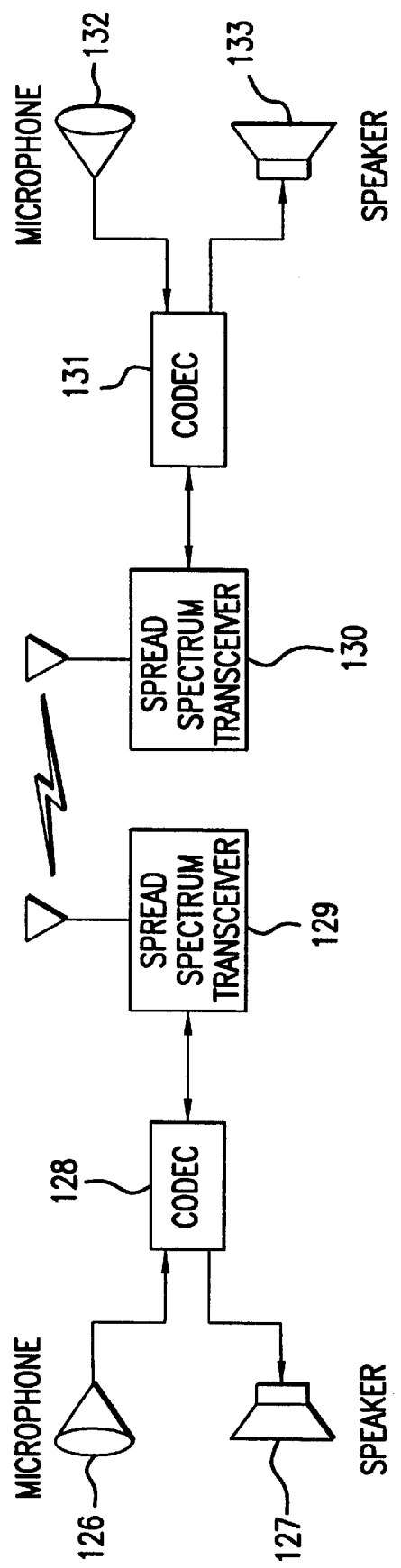
FIG. 10 is the block diagram showing the key elements of voice communication between the two mobile apparatuses.

Full-duplex voice communication is supported by the signal design and the transceiver implementation described in this invention. The voice communication can be engaged between two mobile apparatuses and is typically feasible only when the two mobile apparatuses or one mobile apparatus and the central station are in direct line of sight. The functional block diagram of the voice communication is shown in FIG. 10. The voice from microphone 126, 132 is digitized using the codec 128, 131. The digital codec data is then transmitted to other mobile apparatus via the spread spectrum transceiver 129, 130. The received codec data is converted by codec 128, 131 into analog voice data and the analog voice signal drives the speaker 127, 133 to replicate the voice.

The voice data is transmitted using I-Frame format. The two mobile apparatuses engaged in voice communication use the S-Frame format to set up the communication link and then switch to I-Frame format (and a different carrier frequency and PN code). Since only less half of the TDD frame time is available for transmission, the data rate of I-Frame is at least twice the codec data rate. Since the transmit data rate is higher than the codec data rate, the voice data is buffered in the transceiver memory before it is transmitted. To minimize the voice delay, the amount of voice data buffered in the memory should be small as long as it is enough to ensure the buffered data is not drained out before the end of the transmit packet.

The voice communication is also feasible between two mobile apparatuses, or a mobile apparatus and the central station not directly in line of sight of each other. This is achieved by relaying the voice data via one or more reference stations. To realize non-line-of-sight, real-time voice communication, a TDD frame structure with more than two time slots is required. This allows the relaying reference station to listen to the two signals at two different time slots while transmitting at yet another time slot. Instead of using the store and forward technique to transfer data, the multiple time slots TDD frame allows the voice signal to be transferred via a reference stations while it is being received by that reference station. Both one way and two way voice communication is achievable. In general, the data rate and radio frequency bandwidth required to achieve multiple time slot TDD voice communication is significantly higher than the I-Frame described in this invention. The ability to support voice communication greatly enhances the utility of the present system. This feature distinguishes the present invention from other 'ranging-only' or 'communication-only' systems.

A data message can be transferred between two stations not directly in line of sight with the region. The data message transfer is generally accomplished using the S-Frame format. Depending on the location of the mobile apparatus, the mobile apparatus looks up from its memory a default reference station to send a data message to. The default reference station is generally selected as the reference station which is most visible to a particular position. The mobile apparatus then sends an S-Packet to the selected reference station and waits for the acknowledgment from the reference station in the second half of the frame. The ID of the desired destination station, the ID of the reference station, and the data message are all included in the S-Packet. The receiving reference station checks the ID in the signal and immediately send the acknowledgment back if it matches its own ID. The reference station has a routing table which provides the next station to relay the data message to based on the ID of the destination station. The reference station then sends the data message using an S-Frame to the next station. This process continues until the data message reaches the destination reference station, central station, or mobile apparatus.

The routing table can be implemented in various ways. One is to route the data message based on the shortest route within the region, i.e., to transfer the data message via minimum number of relay reference stations. This has the effect of reducing the data latency and utilizes minimum radio bandwidth thereby minimizing the interference to other stations. The drawback is that the routing table needs to be set up for every pair of stations within the course. More memory is required to store the routing table. Another way to reduce the complexity of the routing table is simply to route the data message back to the central station, then to the desired reference station. In this second implementation, the routing table of the reference station can contain only two entries. One contains the next reference station to route the data message to the central station and the other contains the next reference station to route the data message away from the reference station. When the reference station receives a data message, it needs only to distinguish if the data message has reached the central station or not and selects one of the two possible station to route the data message to. The implementations of routing tables are affected by the tradeoff of the required memory to store the routing table and the utilization of the radio frequency bandwidth.

The data message transfer capability has a variety of applications. For example in a golf course application, it allows the golf course to implement tournament score update. The players in the tournament can report its position and score back to the central station immediately after the play of each hole is completed. It also allows the golfer to page the vending van within the course for beverage. In some cases, if the golfer cannot see the group of players in front of him is out of his range or not, it can page those players to inquire them. This is an important safety feature for the golf course.

A unique feature of the present invention is the ability to allow multiple spread spectrum transceivers to operate simultaneously without interfering with each other. Several techniques can be used in the present invention. The spread spectrum transceivers can use different PN codes to mitigate the effects of mutual interference. Interference between spread spectrum transceivers using different PN codes is reduced depending on the cross-correlation between the PN codes employed. The cross-correlation is defined as the correlator value of two different PN codes when integrated over a correlation time. Different sets of PN codes have different cross-correlation properties. As an example, Gold codes are known to provide minimum cross-correlation between any pair of two PN codes within the same set of Gold code.

Depending on the signal propagation paths, the signal power level of the desired signal and the interference arriving at the receiver vary. In some cases, the difference in power level is so great such that the interference with larger power significantly affects the reception and tracking of the desired signal. This is commonly referred to as near–far problems in the spread spectrum literature. For some positions in the region, when the operator is much closer to a particular reference transceiver, the near far problems usually occur.

This near–far problem can be mitigated by utilizing more than one RF channel for the direct-sequence spread-spectrum signal. This is called frequency division multiple access. The spread spectrum transceivers are provided with the capability to select the carrier frequency and to employ highly selective filtering to eliminate radiation in the adjacent frequency channel. Each time a spread spectrum transceiver is active, its use of the common PN code and the common carrier frequency should be limited to a single S-Frame for establishing the initial communication link. The two transceivers engaged in the communication should immediately switch to another frequency channel and PN code after the first S-Frame to minimize interference to other stations. The selection of the different frequency channel and PN code should be arranged in a way to minimize the possibility of more than one pair of transceivers using the same frequency and PN code at the same time. In typical embodiments of the system, the number of reference stations and mobile apparatuses will exceed the number of available transmit and receive RF channels. Thus frequency re-use is a necessary part of the system of the present system. The system of the present invention can however provide accurate time transfer and range measurements with as little as one direct-sequence spread-spectrum channel for the system.

The near–far problems can also be eliminated by the use of multiple time slots in the TDD frame. Different time slots can be assigned to different transceivers. Since signals arriving at mobile units with large power level difference are assigned different time slots, the near–far problems are avoided. Use of multiple time slots in a TDD Frame in general requires a timing master station. The clocks of the transceivers using multiple time slot are synchronized to same master timing to avoid the time slots from overlapping each other. This is typically more difficult to realized than using different frequency channels.

If the interference does occur between transceivers, the receivers should be capable of using lock detectors to detect if the signal tracking has been disturbed. In addition, CRC (cyclic redundant codes) can be transmitted in the data and checked in the receiver to make sure that data is received correctly. The transceivers can employ re-transmission protocol once the lock detectors or CRC indicates the transceiver loses lock or data being corrupted. This provides added robustness to the system against interference.

The locations of the pre-defined features in the region can be easily determined using a mobile apparatus co-located with the feature whose position is to be determined. The mobile apparatus performs ranging and positioning computation with a set of reference stations as described earlier. Once the position is determined, the location coordinates of the feature can be transmitted as data message back to the central station to update its database. This update position can be disseminated from the central station to all the reference stations. This position determination and update procedure is straightforward and fast and can be performed as soon as the pre-defined features are moved to a new position by system maintenance personnel.

What is claimed is:

1. A system for determining the position and distance between a first point in a geographical region and at least one feature in the geographical region comprising:

a plurality of fixed reference stations located within or in proximity to the geographical region, each of said reference stations provided with a transceiver for receiving and transmitting time division duplex (TDD) spread spectrum RF signals modulated by a pseudo-noise (PN) coded sequence, each of said fixed reference stations also including a memory device and processor in communication with its respective transceiver;

at least two portable apparatuses each provided with an input device and a transceiver capable of transmitting signals, and receiving time division duplex (TDD) spread spectrum RF signals modulated by pseudo-noise (PN) coded sequence, said mobile apparatus also provided with a memory device and processor in communication with said mobile transceiver, said processor in said mobile apparatus determining the distance measurement between said mobile apparatus and at least three of said fixed reference stations and the position coordinates of said mobile processor based upon the time differences of said TDD spectrum signals transmitted and received between said mobile apparatus and said at least three of said fixed stations, said TDD spread spectrum signals transmitted by said fixed reference station also including the positive coordinates of the fixed reference station as well as the position coordinates of a selected feature in the geographical region, the selected feature chosen by said input device, the distance between said mobile apparatus and said selected feature calculated by said processor in said mobile apparatus based upon said position coordinates of said selected feature and the calculated position coordinate of said mobile apparatus, at least two of said mobile apparatus each further provided with a microphone, a speaker and a means for converting audio information into a digital format and converting digital information into audio information, thereby allowing voice information to be received and transmitted by said mobile apparatuses; and output device in communication with said mobile apparatus for outputting the distance between said mobile apparatus and the selected feature.

2. The system in accordance with claim 1, further including a fixed central station located within or in proximity with the geographical region, said central station provided with a transceiver for receiving and transmitting a time division duplex (TDD) spread spectrum signal modulated by a pseudo-noise (PN) coded sequence for communication with each of said fixed reference stations, said central station provided with a processor and memory device, said central station transmitting locational information relating to a plurality of features included in the geographical region.

3. The system in accordance with claim 2, wherein said central station further includes data link and a computer, wherein said data link is communicating information between said central station and said computer, allowing updating of said locational information of said features and said reference station and to collecting and processing information received by said central station.

4. The system in accordance with claim 1, wherein each of said fixed reference station is assigned a specific identification number (ID) stored in said memory device associated with each fixed reference station and wherein each of said fixed reference stations would respond to said TDD spread spectrum signals transmitted to one of said fixed reference stations if said TDD spread spectrum signals contains said ID of that fixed reference station, and further wherein each of said mobile apparatus has been assigned an ID stored in said memory of said mobile apparatus.

5. The system in accordance with claim 3, wherein said memory of said mobile apparatus is provided with the IDs of three of said fixed reference stations for each feature in the geographical region.

6. The system in accordance with claim 5 wherein each of the IDs of three of said fixed reference stations for each feature is transmitted to said mobile apparatus via a spread spectrum signal transmitted by said central station or said fixed reference station, during initialization of said mobile apparatus memory.

7. The system in accordance with claim 2, wherein said TDD spread spectrum signals transmitted by said mobile apparatus, said fixed reference station and said central station include a unique word therein to provide synchronization of the TDD frame timing between said mobile apparatus, said fixed reference stations and said central station.

8. The system in accordance with claim 4, wherein said TDD spread spectrum signals transmitted by said mobile apparatus, said fixed reference station and said central station include a unique word therein to provide synchronization of the TDD frame timing between said mobile apparatus, said fixed reference stations and said central station.

9. The system in accordance with claim 7, wherein said mobile apparatus initially transmits a first TDD spread spectrum signal to one or more of said fixed reference station in an S-packet format at a carrier frequency, and further wherein said fixed reference stations transmits a second TDD spread spectrum signal in an S-packet format at said carrier frequency to said mobile apparatus responsive to said first TDD spread spectrum signal in a S-packet format transmitted from said mobile apparatus.

10. The system in accordance with claim 8, wherein said mobile apparatus initially transmits a first TDD spread spectrum signal to one or more of said fixed reference station in an S-packet format at a carrier frequency, and further wherein said fixed reference stations transmits a second TDD spread spectrum signal in an S-packet format at said carrier frequency to said mobile apparatus responsive to said first TDD spread spectrum signal in a S-packet format transmitted from said mobile apparatus.

11. The system in accordance with claim 9, wherein said mobile apparatus transmits a third TDD spread spectrum signal to one of said fixed reference stations in an R-packet format at a second carrier frequency and a second PN code responsive to the receipt of said second TDD spread spectrum signal in an S-packet format and further wherein said fixed reference station transmits a fourth TDD spread spectrum signal in an R-packet format at said second carrier frequency and said second PN code responsive to the receipt of said third TDD spread spectrum signal.

12. The system in accordance with claim 10, wherein said mobile apparatus transmits a third TDD spread spectrum signal to one of said fixed reference stations in an R-packet format at a second carrier frequency and a second PN code responsive to the receipt of said second TDD spread spectrum signal in an S-packet format and further wherein said fixed reference station transmits a fourth TDD spread spectrum signal in an R-packet format at said second carrier frequency and said second PN code responsive to the receipt of said third TDD spread spectrum signal.

13. The system in accordance with claim 1, wherein said memory device and said processor of said mobile apparatus is provided with a means for estimating the inaccuracy of the position calculation of said mobile apparatus due to geometry of said selected fixed reference stations and further wherein said mobile apparatus compare said estimated inaccuracy in said position calculation to a predetermined value, and further including a means for transmitting additional TDD spread spectrum PN coded signals to initiate at least one additional fixed reference station if said estimated inaccuracy of said position calculated exceeds a predetermined value.

14. The system in accordance with claim 11, wherein said digital information is transmitted by said mobile apparatus using a TDD spread spectrum signal employing an I-packet format, thereby allowing ones said mobile apparatuses to initiate voice communications with a second mobile apparatus on said central status.

15. The system in accordance with claim 9, wherein said digital information is transmitted by said mobile apparatus using a TDD spread spectrum signal employing an I-packet format, thereby allowing ones said mobile apparatuses to initiate voice communications with a second mobile apparatus on said central status.

16. The system in accordance with claim 1, wherein said mobile apparatus obtains the course features information, said fixed reference station coordinates, and other information related to a particular geographical area by receiving data via said spread spectrum transceiver in said mobile apparatus, thereby allowing said mobile apparatus to use said received information to reload its said processor memory to thus automatically re-configure said memory for different geographical areas.

17. A method for determining the position and distance between a first point in a geographical region and at least one selected feature in the geographical region, comprising the steps of:

installing a plurality of fixed reference stations located within or in proximity to the geographical region;

determining the coordinates of each of said fixed reference stations and each of the selected features with respect to a reference point, each of said fixed reference station provided with their individual coordinates and the coordinates of the selected feature;

providing a time division duplex (TDD) spread spectrum pseudo-noise (PN) coded sequence for each of said fixed reference stations;

equipping at least two mobile apparatuses with the PN coded sequences of each of said fixed reference stations, at least two of said mobile apparatuses each provided with a microphone, a speaker and a means for converting audio information into a digital format and converting digital information into audio information, thereby allowing voice information to be received and transmitted by said mobile apparatuses;

initiating a distance request from said mobile apparatus to at least two of said fixed reference stations for determining the distance between said mobile apparatus and one of the selected features by transmitting a first TDD spread spectrum PN coded sequence as unique to at least two of said reference stations;

receiving said TDD spread spectrum PN coded sequence at one of said fixed reference stations;

transmitting a second TDD spread spectrum PN coded signal to said mobile apparatus including the coordinates of said fixed reference station and the coordinates of the selected feature;

determining the position of the mobile apparatus utilizing an algorithm provided in said mobile apparatus based upon the time differentials of the epochs of each of the fixed reference stations and said mobile apparatus;

computing the distance between said mobile apparatus and the selected feature; and providing an output indicating the distance between said mobile apparatus and the selected feature.

18. The method in accordance with claim 17, wherein said first TDD spread spectrum PN coded sequence transmitted by said mobile apparatus is in an S-packet format and said second TDD spread spectrum PN coded signal transmitted from said fixed reference station is in an S-packet format.

19. The method in accordance with claim 18, wherein said mobile apparatus transmits a third TDD spread spectrum signal to said fixed reference station in an R-packet format responsive to the receipt of said second TDD spread spectrum signal in an S-packet format and further wherein said fixed reference station transmits a fourth TDD spread spectrum signal in an R-packet format responsive to the receipt of said third TDD spread spectrum signal.

20. The method in accordance with claim 17 further comprising the steps of providing said mobile apparatus with a means for estimating the distance between said mobile apparatus and each of said fixed reference stations based upon the time differential of the epochs between the transmitted PN code and the received PN code at said mobile apparatus and each of said fixed reference stations;

computing the time differential of said epoch between the transmit PN and received PN code at said fixed reference stations transmitted to said mobile apparatus;

adding said time differential measured in said mobile apparatus and said time differential measured in said fixed reference station transmitted to said mobile apparatus; and subtracting the contributions of hardware delays and the clock frequency difference error to obtain the distance estimate between said mobile apparatus and said fixed reference station.

21. The method in accordance with claim 19 further comprising the steps of:

providing said mobile apparatus with a means for estimating the distance between said mobile apparatus and each of said fixed reference stations based on time differential of the epochs between the transmitted PN code and the received PN code at the said mobile apparatus and each of said fixed reference stations;

computing the time differential of said epoch between the transmit PN and received PN code at said fixed reference stations transmitted to said mobile apparatus;

adding said time differential measured in said mobile apparatus and said time differential measured in said fixed reference station transmitted to said mobile apparatus; and subtracting the contributions of hardware delays and the clock frequency difference error to obtain the distance estimate between said mobile apparatus and said fixed reference station.

22. The method in accordance with claim 20, further providing a means for estimating said hardware delay said mobile apparatus and said fixed reference station by the further steps of:

calibrating said hardware delay in said mobile apparatus and said fixed reference station as a function of temperature prior to deploying said fixed reference stations and said mobile apparatus;

storing in said processor memory of said mobile apparatus and said fixed reference station the table of measured delay as a function of temperature;

using a temperature sensor to determine the temperature of said mobile apparatus and said fixed reference station; and actuating said measured delay value from processor memory as a function of temperature.

23. The method in accordance with claim 20, further providing a means for estimating a clock difference error of said mobile apparatus and said fixed reference station by the further steps of:

obtaining the carrier frequency difference between said mobile apparatus and said fixed reference station from receiver NCO frequency value in said mobile apparatus and said fixed reference station;

deriving the PN code frequency difference between said mobile apparatus and said fixed reference station from said carrier frequency difference; and multiplying the said PN code frequency difference and the elapsed time between the pseudorange measurement in said fixed reference station and said mobile apparatus.

24. The method in accordance with claim 17, wherein said TDD spread spectrum signals transmitted by said mobile apparatus and said fixed reference stations include a unique word therein to provide time synchronization between said mobile apparatus and said fixed reference stations.

25. A method in accordance with claim 17 for sending a data message from one location within a geographical area to another location within the geographical area utilizing said mobile apparatus, comprising the steps of:

looking up in a table stored in said processor memory of said mobile apparatus, a fixed reference station based upon the location of said mobile apparatus;

sending a data message to said fixed reference station incorporating the initiating and destination station ID;

determining the next fixed reference station or central station to relay the data message by looking up in a routing table stored in the processor memory of said fixed reference station; and re-transmitting the data message to the next fixed reference station or central station until the data message reaches the destination station.

26. The system in accordance with claim 1 wherein each of said mobile apparatuses receive and transmit only time division duplex (TDD) signals.

27. The method in accordance with claim 17 wherein only time division duplex (TDD) are received and transmitted by said mobile apparatuses.

\* \* \* \* \*